US011068272B2

(12) United States Patent
Kothinti Naresh

(10) Patent No.: US 11,068,272 B2
(45) Date of Patent: Jul. 20, 2021

(54) TRACKING AND COMMUNICATION OF DIRECT/INDIRECT SOURCE DEPENDENCIES OF PRODUCER INSTRUCTIONS EXECUTED IN A PROCESSOR TO SOURCE DEPENDENT CONSUMER INSTRUCTIONS TO FACILITATE PROCESSOR OPTIMIZATIONS

(71) Applicant: Microsoft Technology Licensing, LLC, Redmond, WA (US)

(72) Inventor: Vignyan Reddy Kothinti Naresh, Morrisville, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/577,879

(22) Filed: Sep. 20, 2019

(65) Prior Publication Data
US 2021/0089312 A1    Mar. 25, 2021

(51) Int. Cl.
*G06F 9/38* (2018.01)
*G06F 9/30* (2018.01)

(52) U.S. Cl.
CPC ........... *G06F 9/384* (2013.01); *G06F 9/3005* (2013.01); *G06F 9/30036* (2013.01);
(Continued)

(58) Field of Classification Search
CPC ... G06F 9/30145; G06F 9/3836; G06F 9/3838
See application file for complete search history.

(56) References Cited

U.S. PATENT DOCUMENTS 7,055,021 B2    5/2006 Kadambi
9,262,171 B2    2/2016 Golla et al.
(Continued)

OTHER PUBLICATIONS

Reinman, et al., "Classifying Load and Store Instructions for Memory Renaming", In Proceedings of International Conference on Supercomputing, Jun. 20, 1999, 10 Pages.
(Continued)

*Primary Examiner* — Zachary K Huson
(74) *Attorney, Agent, or Firm* — Withrow & Terranova, PLLC

(57) ABSTRACT

Tracking and communication of direct/indirect source dependencies of producer instructions executed in a processor to source dependent consumer instructions to facilitate processor optimizations. The processor includes instruction processing circuit configured to process and execute fetched instructions in an instruction stream according to a dataflow execution. The instruction processing circuit includes mechanisms to communicate dependencies to dependent, consumer instructions in an instruction pipeline to facilitate processor optimizations, such as replay of consumer instructions. The instruction processing circuit is configured to track producer instructions and consumer instruction dependencies on its producer instructions in the instruction pipeline in a data structure circuit before the instructions are scheduled for execution. These recorded source dependencies in the source dependency indicators can then be communicated to later stages in the instruction pipeline, such as scheduling, to facilitate for example, replay of dependent consumer instructions, if for example, its producer instruction incurs a hazard.

20 Claims, 10 Drawing Sheets

(52) U.S. Cl.
CPC ...... *G06F 9/30141* (2013.01); *G06F 9/30145* (2013.01); *G06F 9/3867* (2013.01); *G06F 9/3836* (2013.01); *G06F 9/3838* (2013.01)

(56) References Cited

U.S. PATENT DOCUMENTS

| | | |
|---|---|---|
| 9,934,042 B2 | 4/2018 | Abdallah |
| 2003/0182536 A1 | 9/2003 | Teruyama |
| 2009/0276608 A1 | 11/2009 | Shimada et al. |
| 2014/0181476 A1 | 6/2014 | Srinivasan et al. |
| 2014/0344554 A1 | 11/2014 | Abdallah |
| 2016/0371090 A1 | 12/2016 | Brownscheidle et al. |
| 2017/0046160 A1* | 2/2017 | Seth .................... G06F 9/30098 |
| 2017/0046164 A1* | 2/2017 | Madhavan .......... G06F 9/30101 |
| 2017/0364358 A1* | 12/2017 | Adeeb .................. G06F 9/3857 |
| 2018/0081691 A1 | 3/2018 | Kulkarni et al. |
| 2019/0042267 A1 | 2/2019 | Boersma et al. |
| 2019/0163483 A1 | 5/2019 | Silberman et al. |

OTHER PUBLICATIONS

Tyson, et al., "Improving the Accuracy and Performance of Memory Communication Through Renaming", In Proceedings of the 30th Annual ACM/IEEE international symposium on Microarchitecture, Dec. 1, 1997, 10 Pages.

"International Search Report and Written Opinion Issued in PCT Application No. PCT/US20/038853", dated Oct. 12, 2020, 17 Pages.

\* cited by examiner

100

I0: ADD R5, R1

I1: TEQZ.B<I15>

I2: MOVI 1, R6

I3: ADD R1, R6

I4: BRO <I17>

I5: READ R7, R2

I6: ABS R2, R10

TRACKING AND COMMUNICATION OF DIRECT/INDIRECT SOURCE DEPENDENCIES OF PRODUCER INSTRUCTIONS EXECUTED IN A PROCESSOR TO SOURCE DEPENDENT CONSUMER INSTRUCTIONS TO FACILITATE PROCESSOR OPTIMIZATIONS

FIELD OF THE DISCLOSURE

The technology of the disclosure relates to processor-based systems employing a central processing unit (CPU), also known as a "processor," and more particularly to identifying consumer instructions dependent on a producer instruction in computer instructions being processed in an instruction pipeline.

BACKGROUND

Microprocessors, also known as "processors," perform computational tasks for a wide variety of applications. A conventional microprocessor includes a central processing unit (CPU) that includes one or more processor cores, also known as "CPU cores." The CPU executes computer program instructions ("instructions"), also known as "software instructions" to perform operations based on data and generate a result, which is a produced value. An instruction that generates a produced value is a "producer" instruction. The produced value may then be stored in memory, provided as an output to an input/output ("I/O") device, or made available (i.e., communicated) as an input value to another "consumer" instruction executed by the CPU, as examples. Examples of producer instructions are load instructions and read instructions. A consumer instruction is dependent on the produced value produced by a producer instruction as an input value to the consumer instruction for execution. These consumer instructions are also referred to as dependent instructions on a producer instruction. Said another way, a producer instruction is an influencer instruction that influences the outcome of the operation of its dependent instructions as influenced instructions. For example, FIG. 1 illustrates a computer instruction program 100 that includes producer and consumer instructions dependent on the producer instructions. For example, instruction I0 is a producer instruction in that it causes a processor to store a produced result in register 'R1' when executed. Instruction I3 is a dependent instruction on instruction I0, because register 'R1' is a source register of instruction I3. Instruction I3 is also a producer instruction for register 'R6'.

Instruction pipelining is a processing technique whereby the throughput of instructions being executed by a processor may be increased by splitting the handling of each instruction into a series of steps. These steps are executed in one or more instruction pipelines each composed of multiple stages in an instruction processing circuit in a processor. Optimal processor performance may be achieved if all stages in an instruction pipeline are able to process instructions concurrently and sequentially as the instructions are ordered in the instruction pipeline. Also, many modern processors are out-of-order processors that are capable of dataflow execution of instructions based on availability of input data to be consumed by the instructions rather than the program order of the instructions. Thus, the out-of-order processor may execute an instruction as soon as all input data to be consumed by the instruction has been produced. While dataflow order processing of instructions may cause the specific order in which instructions are executed to be unpredictable, dataflow order execution in an out-of-order processor may realize performance gains. For example, instead of having to "stall" (i.e., intentionally introduce a processing delay) while input data to be consumed is retrieved for an older instruction, the out-of-order processor may proceed with executing a more recently fetched instruction that is able to execute immediately. In this manner, processor clock cycles that would otherwise be unused for instruction processing and execution may be productively utilized by the out-of-order processor.

An instruction processing circuit in a processor includes an instruction fetch circuit that is configured to fetch instructions to be executed from an instruction memory (e.g., system memory or an instruction cache memory). The fetched instructions are decoded and inserted into an instruction pipeline in the instruction processing circuit to be pre-processed before reaching an execution circuit to be executed. The decoded instructions are also provided to a reservation station circuit in a scheduler circuit. The scheduler circuit is configured to issue a decoded instruction from the reservation station circuit to an execution circuit to be executed once all source operands (e.g., immediate values, registers, values stored in memory, and produced values from a producer instruction) are available and any structural hazards for the decoded instruction are resolved. For example, the scheduler circuit is responsible for making sure that the necessary values for operands of a decoded consumer instruction are available before issuing the decoded consumer instruction to an execution circuit for execution. The execution circuit is configured to execute decoded instructions received from the scheduler circuit.

The scheduler circuit is configured to issue a wake-up signal to "wake up" a consumer instruction in response to issuance of a producer instruction to the execution circuit. The wake-up signal indicates that a produced value from execution of the issued producer instruction will be available, and thus the consumer instruction of the producer instruction can now be issued to the execution circuit behind the producer instruction. In other words, once a producer instruction is scheduled by the scheduler circuit to be issued from the reservation station circuit to the execution circuit, it is known that a produced value from execution of the producer instruction will soon become available for its consumer instruction. Typically, a consumer instruction is augmented with some information about its immediate producer instructions or their immediate dependent instructions (e.g., through a forward-flow mechanism). This information in the reservation station circuit is used by the scheduling logic to determine the availability of a consumer instruction's operands and determine if the instruction is ready to be issued for execution.

SUMMARY

Aspects disclosed herein include tracking and communication of direct/indirect source dependencies of producer instructions executed in a processor to source dependent consumer instructions to facilitate processor optimizations. The processor includes an instruction processing circuit that includes a number of instruction processing stages configured to pipeline the processing and execution of fetched instructions in an instruction stream according to a dataflow execution. The instruction pipeline facilitates the communication of produced values from producer instructions to its younger consumer instructions in an instruction pipeline that are dependent on the producer instructions. The dependency of a younger consumer instruction on a producer instruction can be direct dependency or indirect dependency. For example, a consumer instruction may consume a value from a source that is indirectly dependent on a value by an ancestor producer instruction. An ancestor producer instruction for a consumer instruction is a producer instruction that is older than an immediate producer instruction for a consumer instruction. However, as an example, the consumer instructions may need to be replayed for execution in the event a hazard occurs that affects its producer instructions, such as a branch misprediction. This is to ensure that the consumer instruction executes with the correct consumed value.

In this regard, in exemplary aspects disclosed herein, the instruction processing circuit includes an instruction dependency tracking circuit to track and communicate source dependencies (direct and/or indirect) to source dependent, consumer instructions in an instruction pipeline to facilitate processor optimizations, such as replay of consumer instructions. In certain examples, the instruction dependency tracking circuit is configured to track producer instructions and consumer instruction dependencies on its producer instructions in the instruction pipeline in a data structure circuit before the instructions are scheduled for execution. For example, a rename map table in the processor could be augmented to record each source's dependence on a produced value by an ancestor producer instruction as a source dependency indicator. For example, a source dependency indicator could be recorded in the form of a bit vector with a pre-assigned bit per producer instruction. For example, bit vector '011' as a source dependency indicator stored in association with source register 'R6' in the rename map table could signify that instruction I0 (identified by '1' in least significant bit (LSB)) and instruction I1 (identified by '1' bit 2 adjacent to the LSB) affects the value of register Thus, any consumer instructions with a source register of 'R6' are known to be source dependent on instructions I0 and I1 as a source dependency. These recorded source dependencies in the source dependency indicators can then be communicated to later stages in the instruction pipeline, such as scheduling, to facilitate for example, replay of dependent consumer instructions, if for example, its producer instruction incurs a hazard.

In certain exemplary aspects, the instruction processing circuit and an instruction pipeline in a processor can be configured to facilitate consumer instructions tracking its producer instructions without the producer instruction having to explicitly track its source dependent, consumer instructions. For example, an instruction pipeline may include one or more reservation station circuits in a scheduler circuit that holds or reserves instructions until the instructions are scheduled to be executed. The reservation station circuits can be configured to store a record of each source's dependency on any producer instructions. Thus, any reserved consumer instructions in reservation station circuits that have a source identified as dependent on a producer instruction will be known. An instruction dependency tracking circuit in the instruction pipeline can be configured to communicate source dependencies on a producer instruction(s) via the recorded source dependency indicators to its dependent consumer instructions by broadcasting the source dependency indicators to the reservation stations circuits in the instruction pipeline. For example, each reservation station circuit could have a source entry for each particular source for storing a source dependency indicator for that source identifying any producer instructions for the particular source. In response to the instruction dependency tracking circuit broadcasting the source dependency indicators recorded for each source to the reservation station circuits, each reservation station circuit could then store the source dependency indicators for each source and use the settings in the source dependency indicators to determine if any of its reserved instructions have a source identified as having source dependency. As an example, such reserved instructions identified as having the source identified could be replayed. The instruction dependency tracking circuit can broadcast the source dependency indicators to the reservation station circuits as new instructions are fetched and processed in the instruction pipeline, and the source dependency indicators are updated. Consumer instructions can be scheduled for execution in the reservation station circuits based on current source data once its producer instructions have been committed for execution.

In other exemplary aspects, the instruction dependency tracking circuit in the instruction processing circuit in a processor can be configured to facilitate producer instructions tracking its source dependent, consumer instructions. As an example, a source dependency indicator maintained by the instruction dependency tracking circuit that indicates a source's dependency on producer instructions could be used as a pointer to an influencer tracking table circuit configured to have or allocate separate influencer instruction entries for each producer instruction. The influencer instruction entries in the influencer tracking table circuit are configured to indicate each source location dependent on the influencer, producer instruction. When the source dependency indicator (e.g., bit vector) is updated to record a source's dependency on a producer instruction, the source location of a consumer instruction that is dependent on such source can be recorded. A source location may be the identification of a particular reservation station circuit, an offset into an instruction block, or an offset from the beginning of a subroutine as non-limiting examples. For example, if instruction I2 having source 'R6' is assigned to reservation station circuit '5', and the source dependency bit vector '011' is stored in association with source register 'R6' in the rename map table (meaning source register 'R6' is source dependent on instructions I0 and I1), the influencer instruction entries in the influencer tracking table circuits for producer instructions I0 and I1 are both updated to indicate that reservation station circuit '5' is dependent on respective instructions I0 and I1. In this example, the source locations recorded in the influencer instruction entries in the influencer tracking table circuit can then be used to control to which reservation station circuits the source dependency indicators are sent. The reservation station circuits can then use the received source dependency bit vector to determine if a consumer instruction having an identified dependent source should be replayed for example. In this example, the reservation station circuits do not have to be configured with entries for storing all the source dependency bit vectors.

In this regard, in one exemplary aspect, a processor is provided. The processor comprises an instruction processing circuit comprising one or more instruction pipelines and configured to fetch a plurality of instructions from a memory into an instruction pipeline among the one or more instruction pipelines. The processor also comprises an instruction dependency tracking table circuit comprising a plurality of source entries each associated with a respective source, and each configured to store a source dependency indicator indicating a producer instruction of the associated source. The processor also comprises an instruction dependency tracking circuit configured to receive an instruction from an instruction pipeline among the one or more instruction pipelines, and determine if the received instruction comprises a source as a target operand. In response to determining the received instruction comprises the source as the target operand, the instruction dependency tracking circuit is further configured to store an instruction identifier of the received instruction in an updated source dependency indicator in a source entry associated with the source in the instruction dependency tracking table circuit, and communicate the updated source dependency indicators stored in the plurality of source entries to at least one processing circuit in the instruction processing circuit configured to process an instruction having a source dependency in the updated source dependency indicators.

In another exemplary aspect, a method of tracking source dependencies of producer instructions in a processor is provided. The method comprises receiving an instruction from an instruction pipeline among one or more instruction pipelines in an instruction processing circuit. The method also comprises determining if the received instruction comprises a source as a target operand. The method also comprises, in response to determining the received instruction comprises the source as the target operand, storing an instruction identifier of the received instruction in an updated source dependency indicator indicating a producer instruction of an associated source in a source entry among a plurality of source entries in an instruction dependency tracking table circuit, and communicating the updated source dependency indicators stored in the plurality of source entries to at least one processing circuit in the instruction processing circuit configured to process an instruction having a source dependency in the updated source dependency indicators.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 1 is an exemplary instruction stream that can be executed by the instruction processing circuit in a processor and to illustrate source dependencies between consumer instructions and producer instructions that provide values to such registers;

FIG. 2 is a diagram of an exemplary processor-based system that includes a processor with an instruction processing circuit that includes one or more instruction pipelines for processing computer instructions for execution, and wherein the instruction processing circuit includes an instruction dependency tracking circuit configured to track and communicate source dependencies of a producer instruction(s) to consumer instructions that operate on such sources;

Figure 2:
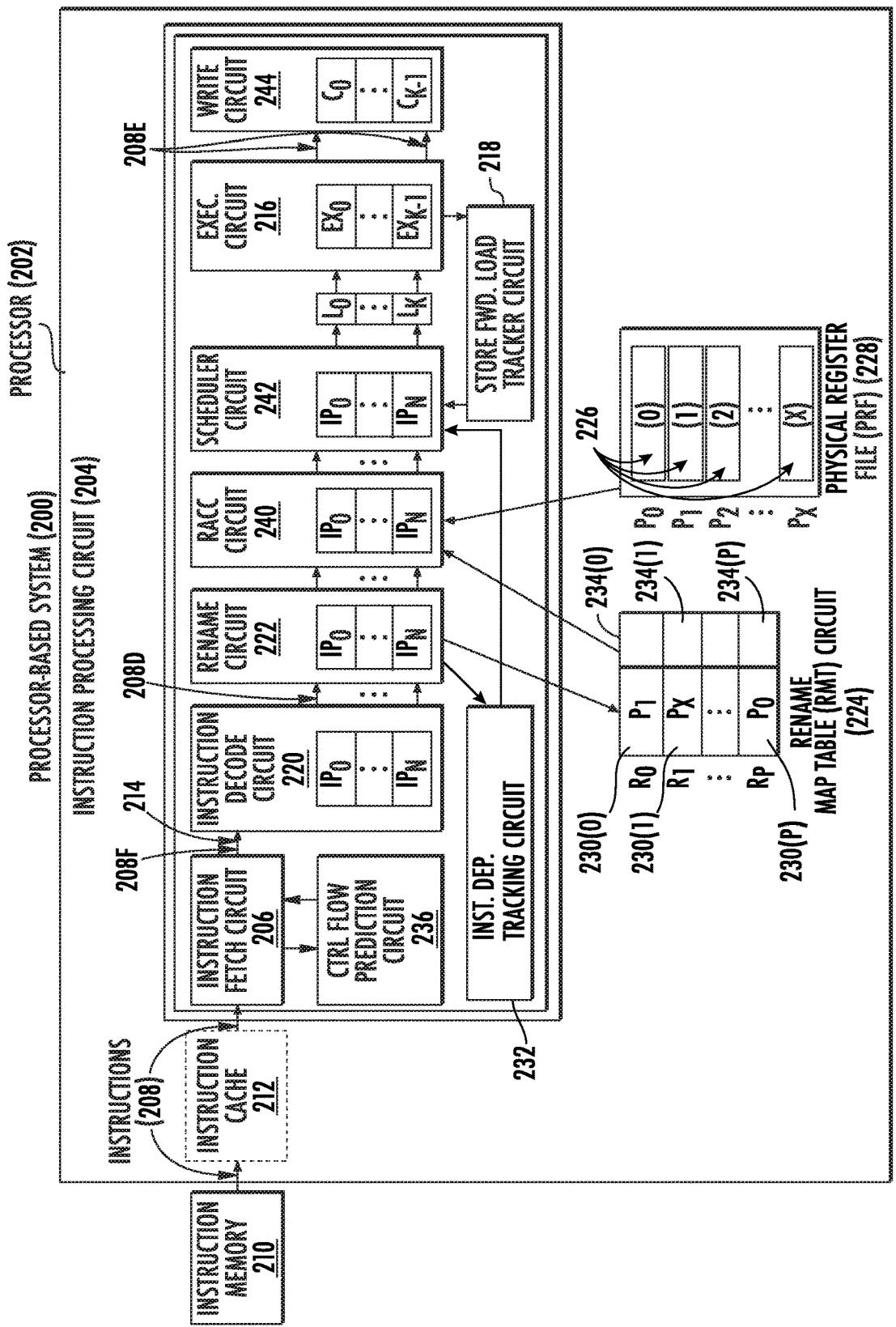
Figure 3A:
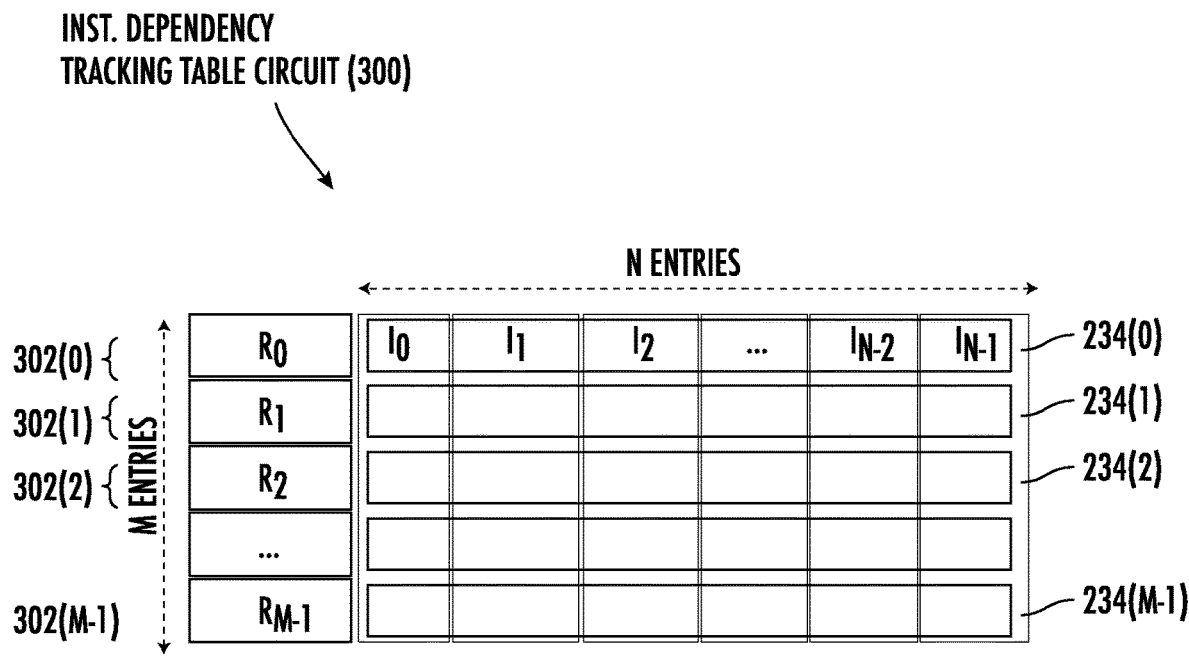
FIG. 3A is a diagram of an exemplary instruction dependency tracking table circuit that can be included in the processor in FIG. 2 that has a plurality of source entries that can be allocated to respective producer instructions in an instruction stream in the processor to store the identified source dependencies for each producer instruction.
Figure 3B:
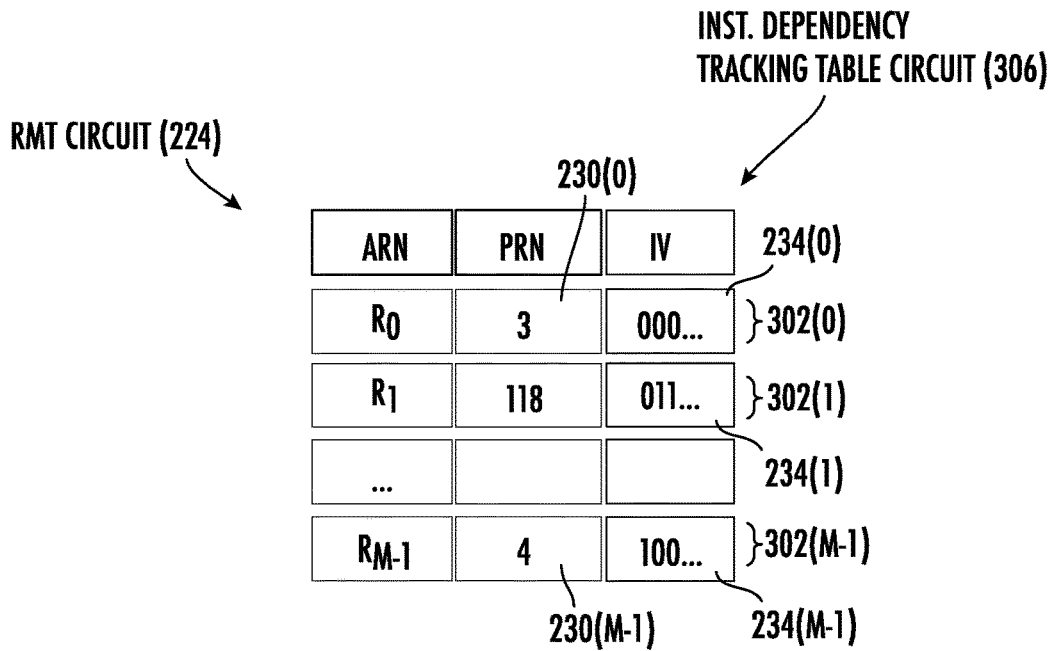
FIG. 3B is a diagram of another exemplary instruction dependency tracking table circuit incorporated into a rename map table in the processor in FIG. 2.
Figure 4:
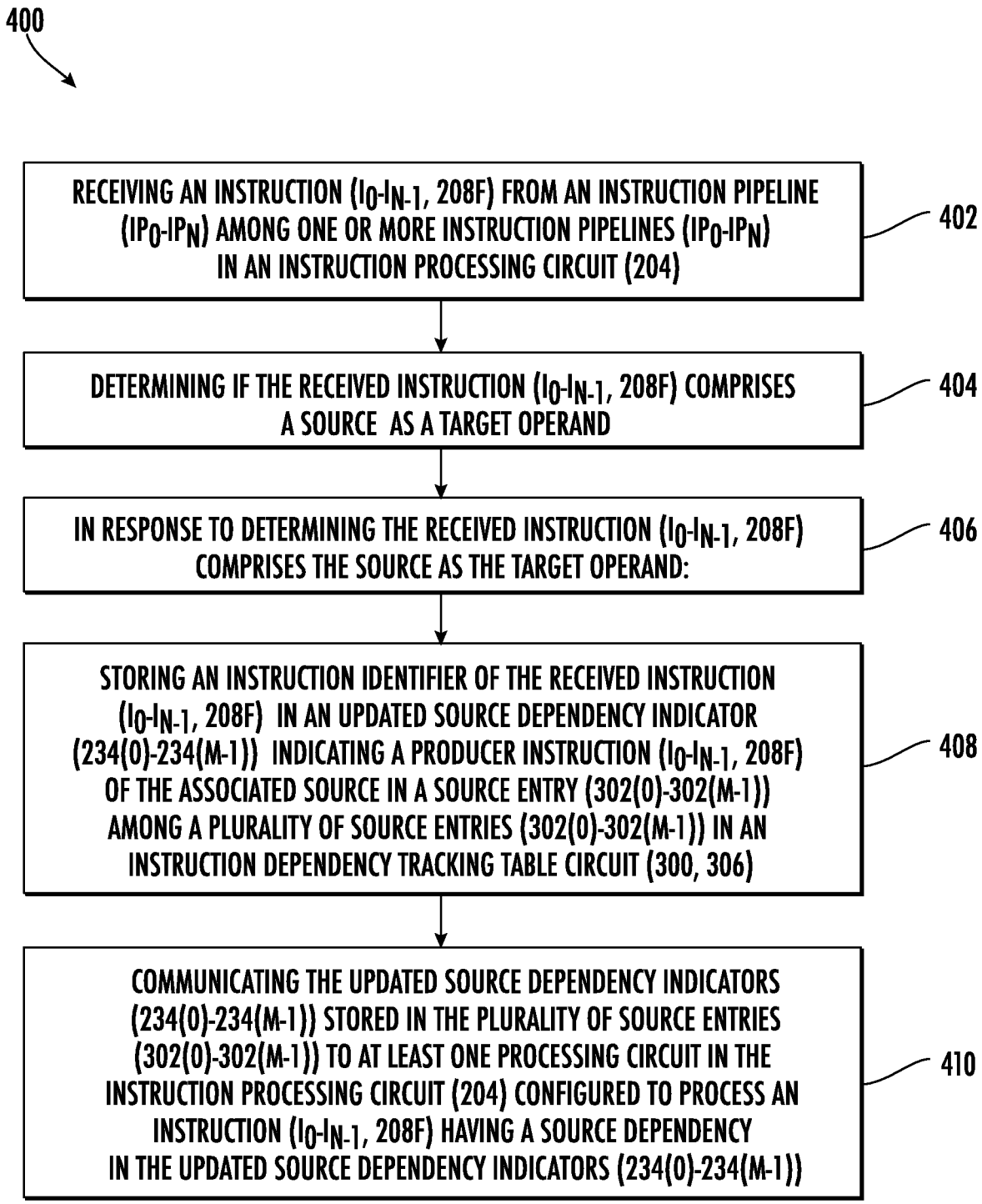
Figure 5:
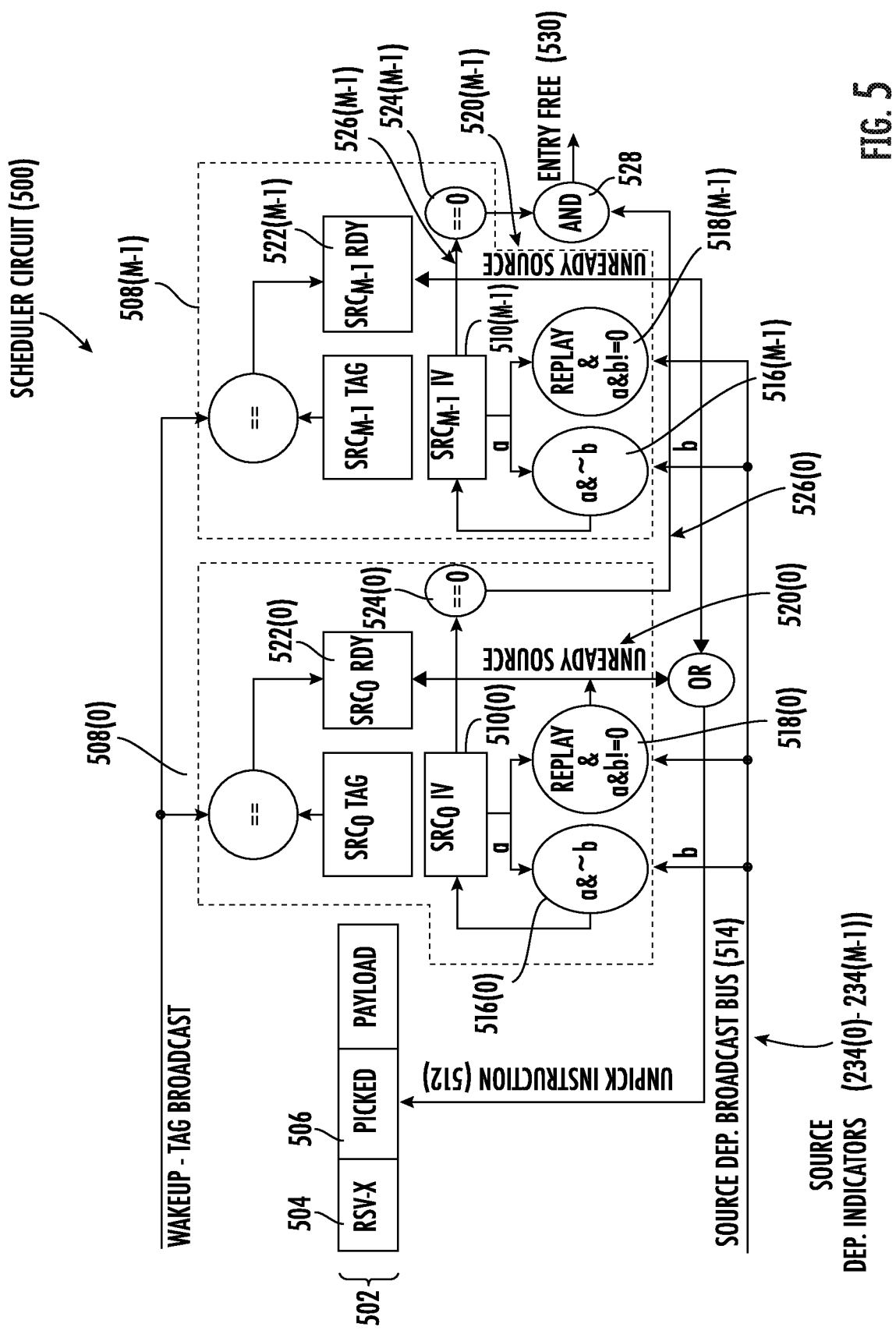
Figure 6:
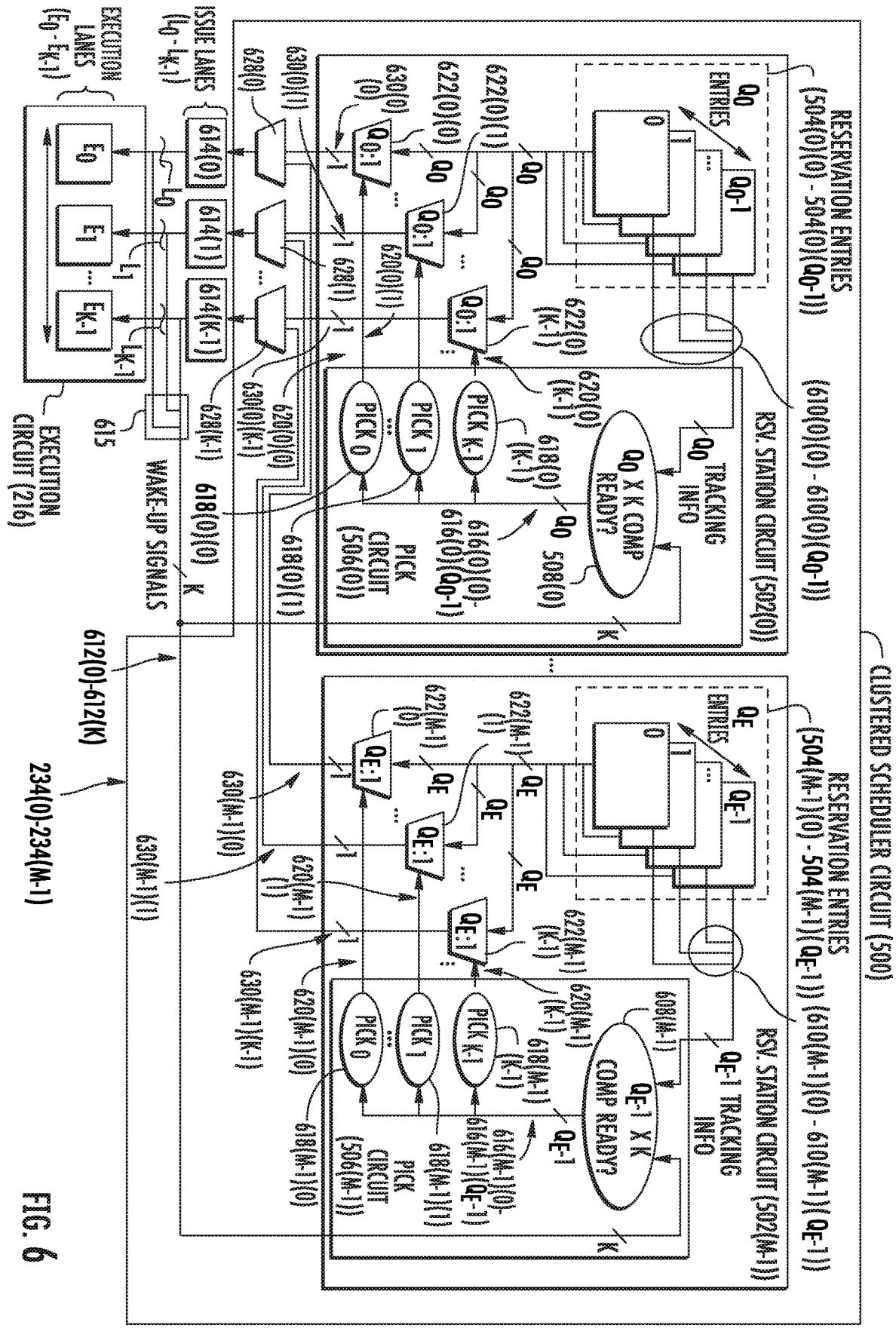
Figure 7:
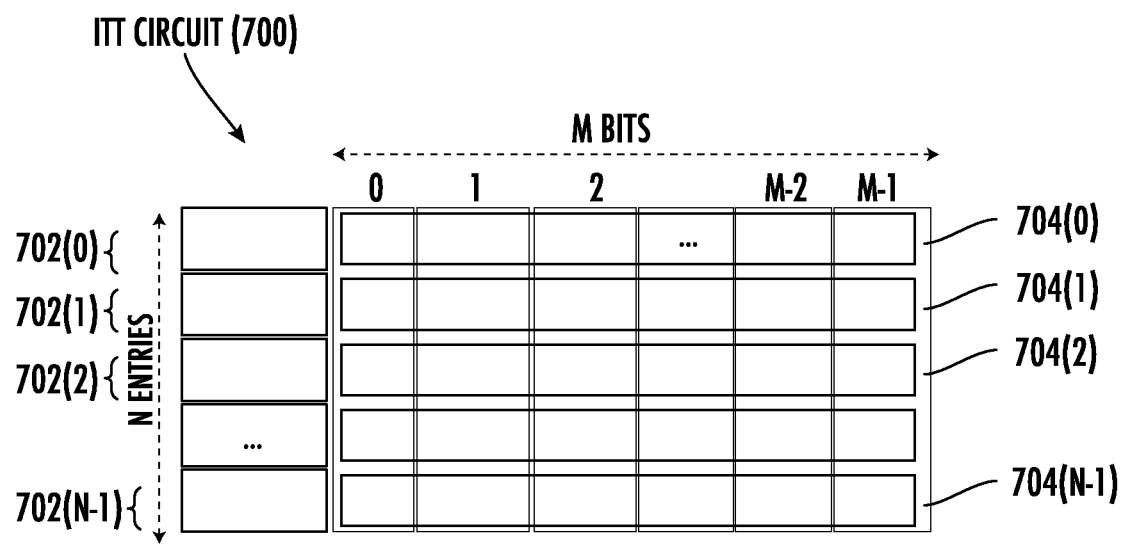
Figure 8:
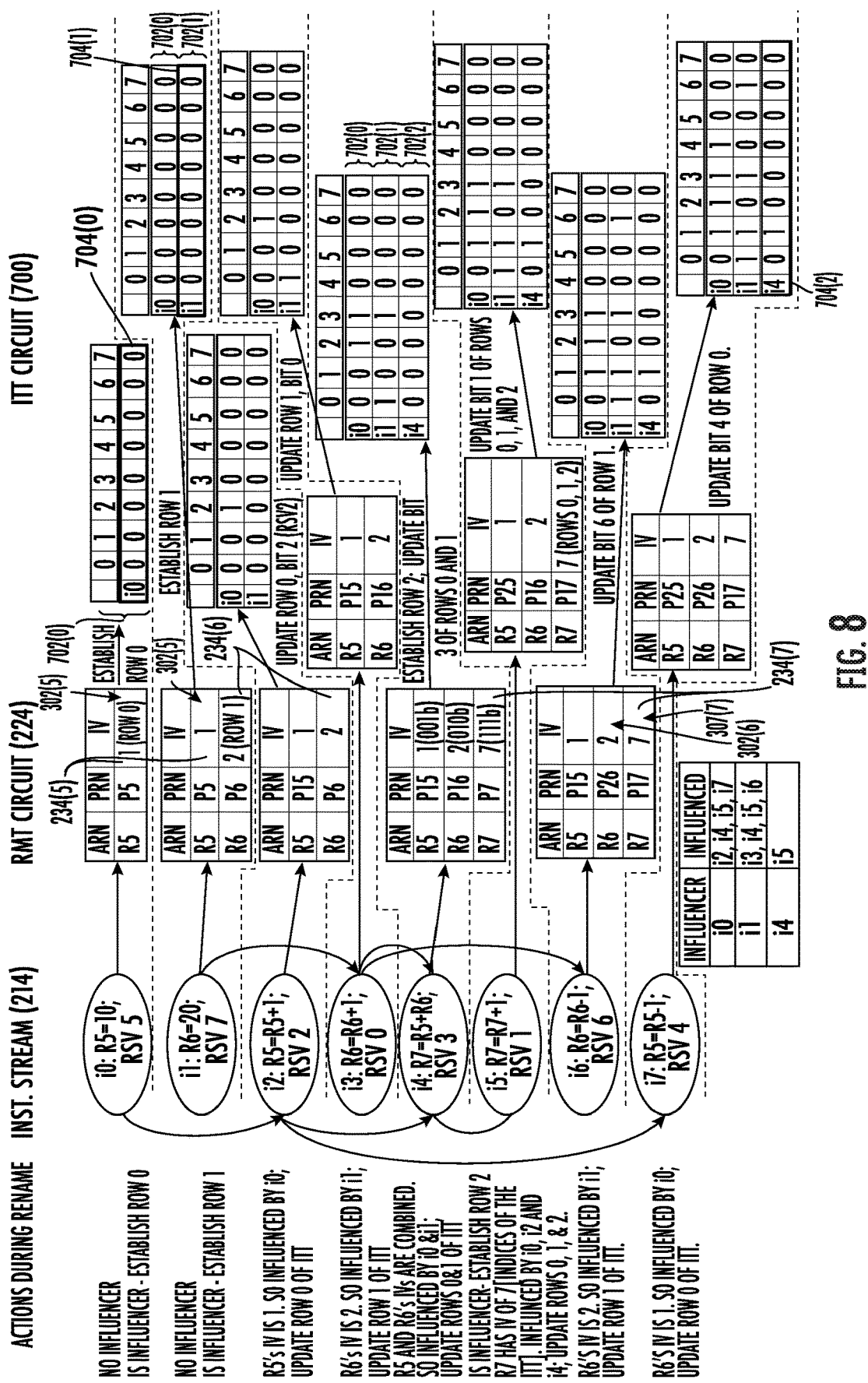

FIG. 4 is a flowchart illustrating an exemplary process of updating a source entry in a source dependency tracking table in response to producer instructions and consumer instructions processed in the instruction stream in the instruction processing circuit in FIG. 2, to track source dependencies of the producer instructions, and communicate the tracked source dependencies in the instruction pipeline as source dependency indicators to a circuit that processes the consumer instructions;

FIG. 5 is a diagram of an exemplary scheduler circuit that can be included in the instruction processing circuit in FIG. 2, wherein the scheduler circuit includes one or more reservation station circuits to reserve instructions to be issued for execution and one or more pick circuits to determine and control when such instructions are ready to be issued, wherein the pick circuits are configured to receive broadcasted source dependency indicators indicating source dependencies on producer instructions used to determine source dependencies of reserved instructions;

FIG. 6 is a diagram of an exemplary scheduler circuit that can be included as the scheduler circuit in the instruction processing circuit in FIG. 3 and that includes additional exemplary detail on the reservation station circuits and pick circuits in the scheduler circuit in FIG. 5;

FIG. 7 is a diagram of an exemplary influencer tracking table circuit configured to have or allocate separate instruction entries for tracking each producer instruction's source dependencies;

FIG. 8 is a diagram of an exemplary updating of an instruction dependency tracking table circuit as in FIGS. 3A and 3B and related indexing influencer instruction entries in the influencer tracking table circuit of FIG. 2 to facilitate producer instructions tracking their source dependent, consumer instructions.

Figure 9:
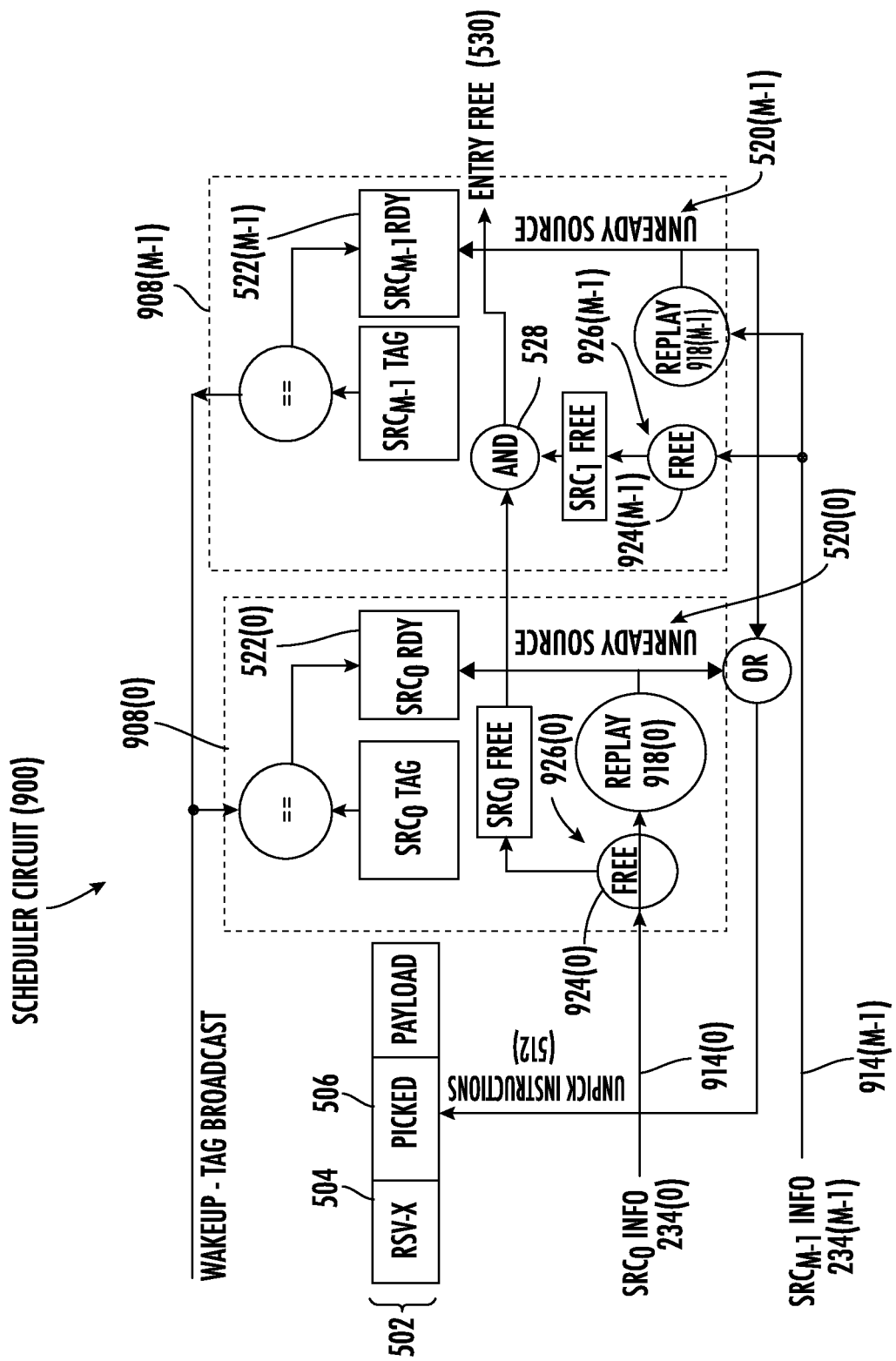
Figure 10:
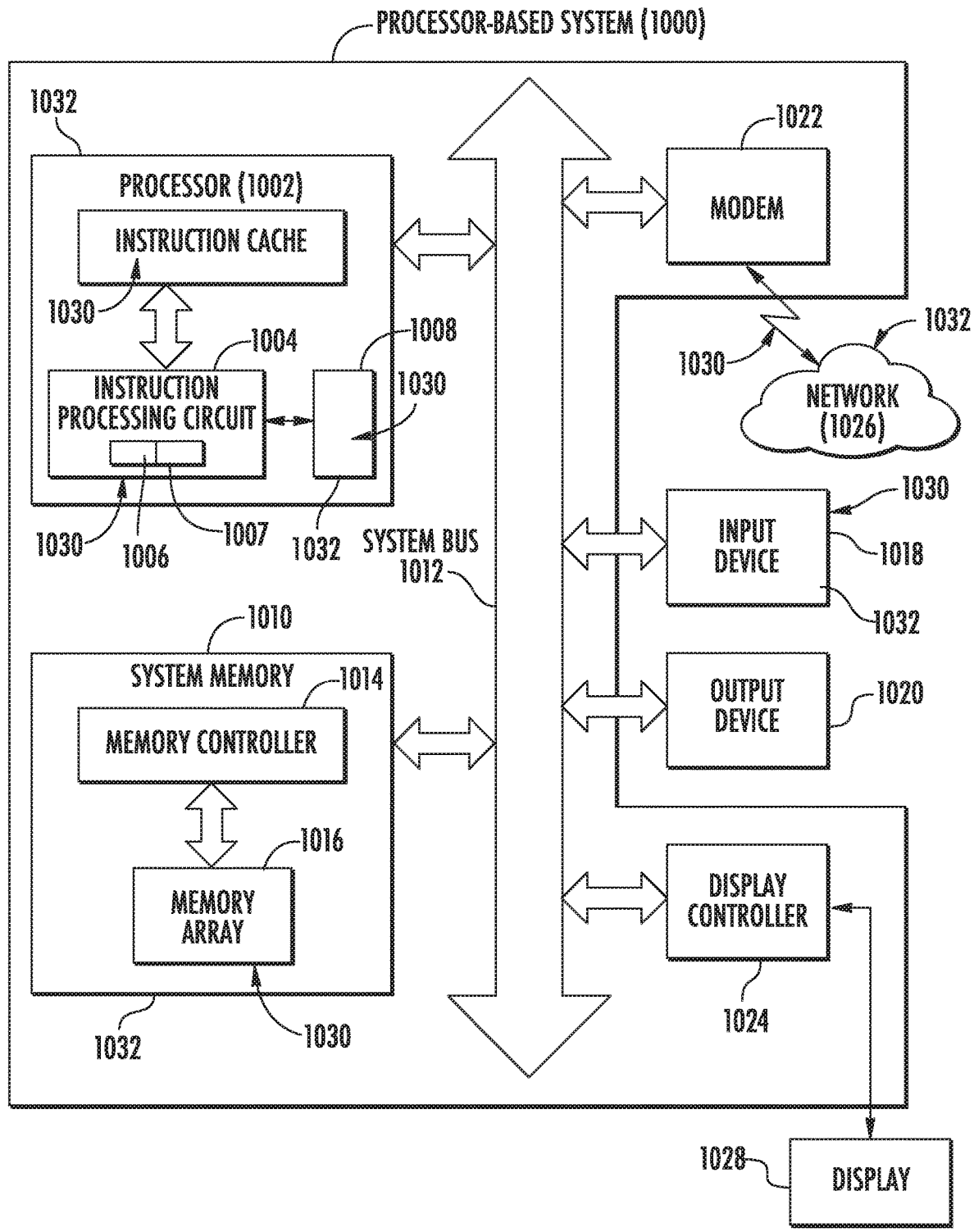

FIG. 9 is a diagram of an exemplary scheduler circuit that can be included in the instruction processing circuit in FIG. 2, wherein each pick circuit is configured to receive a dedicated source dependency indicator indicating source dependencies on producer instructions used to determine source dependencies of reserved instructions; and FIG. 10 is a block diagram of an exemplary processor-based system that includes a processor with an instruction processing circuit that includes an instruction dependency tracking circuit configured to track and communicate source dependencies of a producer instruction(s) to consumer instructions that operate on such sources, including but not limited to the instruction dependency tracking circuit in FIGS. 2-3B and 8, and a scheduler circuit configured to receive source dependency indicators indicating source dependencies on producer instructions used to determine source dependencies of reserved instructions, including but not limited to the scheduler circuits in FIGS. 5, 6 and 9.

DETAILED DESCRIPTION

Aspects disclosed herein include tracking and communication of source dependencies of producer instructions executed in a processor to source dependent consumer instructions to facilitate processor optimizations. The processor includes an instruction processing circuit that includes a number of instruction processing stages configured to pipeline the processing and execution of fetched instructions in an instruction stream according to a dataflow execution. The instruction pipeline facilitates the communication of produced values from producer instructions to its younger consumer instructions in an instruction pipeline that are dependent on the producer instructions. The dependency of a younger consumer instruction on a producer instruction can be direct dependency or indirect dependency. For example, a consumer instruction may consume a value from a source that is indirectly dependent on a value by an ancestor producer instruction. An ancestor producer instruction for a consumer instruction is a producer instruction that is older than an immediate producer instruction for a consumer instruction. However, as an example, the consumer instructions may need to be replayed for execution in the event a hazard occurs that affects its producer instructions, such as a branch misprediction. This is to ensure that the consumer instruction executes with the correct consumed value.

In this regard, in exemplary aspects disclosed herein, the instruction processing circuit includes an instruction dependency tracking circuit to track and communicate source dependencies to source dependent, consumer instructions in an instruction pipeline to facilitate processor optimizations, such as replay of consumer instructions. In certain examples, the instruction dependency tracking circuit is configured to track producer instructions and consumer instruction dependencies on its producer instructions in the instruction pipeline in a data structure circuit before the instructions are scheduled for execution. For example, a rename map table in the processor could be augmented to record each source's dependence on a produced value by an ancestor producer instruction as a source dependency indicator. For example, a source dependency indicator could be recorded in the form of a bit vector with a pre-assigned bit per producer instruction. For example, bit vector '011' as a source dependency indicator stored in association with source register 'R6' in the rename map table could signify that instruction I0 (identified by '1' in least significant bit (LSB)) and instruction I1 (identified by '1' bit 2 adjacent to the LSB) are producers of register 'R6'. Thus, any consumer instructions with a source register of 'R6' are known to be source dependent on instructions I0 and I1. These recorded source dependencies in the source dependency indicators can then be communicated to later stages in the instruction pipeline, such as scheduling, to facilitate for example, replay of dependent consumer instructions, if for example, its producer instruction incurs a hazard.

FIG. 2 is a diagram of an exemplary processor-based system that includes a processor with an instruction processing circuit that includes one or more instruction pipelines for processing computer instructions for execution, and wherein the instruction processing circuit includes an instruction dependency tracking circuit configured to track and communicate source dependencies of a producer instruction(s) to consumer instructions that operate on such sources;

In this regard, FIG. 2 is a schematic diagram of an exemplary processor-based system 200 that includes a processor 202. The processor 202 includes an instruction processing circuit 204 that includes one or more instruction pipelines $IP_0$-$IP_N$ for processing computer instructions for execution. The processor 202 may be an in-order or an out-of-order processor (OoP) as examples. The instruction processing circuit 204 includes an instruction fetch circuit 206 that is configured to fetch instructions 208 from an instruction memory 210. The instruction memory 210 may be provided in or as part of a system memory in the processor-based system 200 as an example. An instruction cache 212 may also be provided in the processor 202 to cache the instructions 208 fetched from the instruction memory 210 to reduce latency in the instruction fetch circuit 206. The instruction fetch circuit 206 in this example is configured to provide the instructions 208 as fetched instructions 208F into the one or more instruction pipelines $IP_0$-$IP_N$ as an instruction stream 214 in the instruction processing circuit 204 to be pre-processed, before the fetched instructions 208F reach an execution circuit 216 to be executed. The fetched instructions 208F in the instruction stream 214 include producer instructions and consumer instructions that consume produced values as a result of the instruction processing circuit 204 executing producer instructions. The instruction pipelines $IP_0$-$IP_N$ are provided across different processing circuits or stages of the instruction processing circuit 204 to pre-process and process the fetched instructions 208F in a series of steps that can be performed concurrently to increase throughput prior to execution of the fetched instructions 208F by the execution circuit 216. For example, fetched store-based instructions 208F identified as having store-forward loads in the instruction stream 214 can be identified by a store forward load tracker circuit 218 in the instruction processing circuit 204 before being executed to be forwarded to be consumed by fetched consuming load-based instructions 208F.

With continuing reference to FIG. 2, the instruction processing circuit 204 also includes an instruction decode circuit 220 configured to decode the fetched instructions 208F fetched by the instruction fetch circuit 206 into decoded instructions 208D to determine the instruction type and actions required. The instruction type and actions required encoded in the decoded instruction 208D may also be used to determine in which instruction pipeline $I_0$-$I_N$ the decoded instructions 208D should be placed. In this example, the decoded instructions 208D are placed in one or more of the instruction pipelines $IP_0$-$IP_N$ and are next provided to a rename map table (RMT) circuit 224 in the instruction processing circuit 204. The RMT circuit 224 is configured to determine if any register names in the decoded instructions 208D need to be renamed to break any register dependencies that would prevent parallel or out-of-order processing. The RMT circuit 224 is configured to call upon the rename circuit 222 to rename a logical register operand and/or write a destination register operand of a decoded instruction 208D to available physical registers 226(0)-226(X) ($P_0, P_1, \ldots, P_X$) in a physical register file (PRF) 228. The RMT circuit 224 contains a plurality of mapping entries 230(0)-230(P) each mapped to (i.e., associated with) a respective logical register $R_0$-$R_P$. The mapping entries 230(0)-230(P) are configured to store information in the form of an address pointer to point to a physical register 226(0)-226(X) in the PRF 228. Each physical register 226(0)-226(X) in the PRF 228 contains a data entry configured to store data for the source and/or destination register operand of a decoded instruction 208D.

As will be discussed in more detail below, the instruction processing circuit 204 also includes an instruction dependency tracking circuit 232 configured to track and communicate source dependencies of a producer instruction(s) 208F to consumer instructions 208F that operate on such sources. The instruction dependency tracking circuit 232 is configured to track producer instructions 208F and consumer instruction 208F having source dependencies on its producer instructions in the instruction pipelines $IP_0$-$IP_N$ before the instructions are scheduled for execution. For example, the RMT circuit 224 in the processor 202 could be augmented with source dependency entries each configured to store a source dependency indicator 234(0)-234(P) indicating a source's dependence on a producer instruction 208F as a source dependency indicator. In other words, the source dependency indicator can identify producer instructions that produce values for the associated source register. For example, if an instruction I0, 208F produces a value in source register 'R6', the source dependency indicator 234(0)-234(P) in the RMT circuit 224 associated with register 'R6' could be updated to indicate that instruction I0 208F is a producer of register 'R6'. Thus, any consumer instructions 208F in the instruction processing circuit 204 with a register of 'R6' are known to be source dependent on instruction I0, 208F. These recorded source dependencies can then be communicated to later stages in the instruction pipeline, such as scheduling, to facilitate for example, replay of dependent consumer instructions, if for example, its producer instruction incurs a hazard.

With continuing reference to FIG. 2, the instruction processing circuit 204 in the processor 202 also includes a control flow prediction circuit 236 (e.g., a branch prediction circuit) to speculate or predict the outcome of a condition of a fetched conditional control instruction 208F, such as a conditional branch instruction. The outcome of the conditional control instruction 208F affects the instruction control flow path of the instruction stream 214 processed in the instruction pipelines $IP_0$-$IP_N$. The prediction of the control flow prediction circuit 236 can be used by the instruction fetch circuit 206 to determine the next fetched instructions 208F to fetch based on the predicted target address.

The instruction processing circuit 204 in the processor 202 in FIG. 2 also includes a register access (RACC) circuit 240. The RACC circuit 240 is configured to access a physical register 226(1)-226(X) in the PRF 228 based on a mapping entry 230(0)-230(P) mapped to a logical register $R_0$-$R_P$ in the RMT circuit 224 of a register operand of a decoded instruction 208D to retrieve a produced value from an executed instruction 208E in the execution circuit 216. The RACC circuit 240 is also configured to provide the retrieved produced value from an executed decoded instruction 208E as the register operand of a decoded instruction 208D to be executed. Also, in the instruction processing circuit 204, a scheduler circuit 242 is provided in the instruction pipeline $IP_0$-$IP_N$ and is configured to store decoded instructions 208D in reservation entries until all register operands for the decoded instruction 208D are available. For example, the scheduler circuit 242 is responsible for determining that the necessary values for operands of a decoded consumer instruction 208D are available before issuing the decoded consumer instruction 208D in an issue lane $L_0$-$L_{K-1}$ among 'K' issue lanes to the execution circuit 216 for execution. The scheduler circuit 242 issues decoded instructions 208D ready to be executed to the execution circuit 216. A write circuit 244 is also provided in the instruction processing circuit 204 to write back or commit produced values from executed instructions 208E to memory, such as the PRF 228, cache memory, or system memory.

FIG. 3A is a diagram of an exemplary instruction dependency tracking table circuit 300 that can be included in the processor 202 in FIG. 2 to record direct and/or indirect source dependencies of a producer instruction(s) 208F to consumer instructions 208F tracked by the instruction dependency tracking circuit 232. The tracked source dependencies can be communicated to other processing circuits in the instruction processing circuit 204. The instruction dependency tracking table circuit 300 includes 'M-1' source entries 302(0)-302(M-1) in this example each associated with a respective source register $R_0$-$R_{M-1}$. Each source entry 302(0)-302(M-1) is configured to store a source dependency indicator 234(0)-234(M-1) each including N-1 bits capable of being set to indicate up to 'N-1' producer instructions $I_0$-$I_{N-1}$ that can be indicated as influencing the respective associated source register $R_0$-$R_{M-1}$. For example, if source register $R_0$ is produced by producer instructions $I_1$ and $I_2$, a bit vector of "011 . . . ." could be stored in the respective source dependency indicator 234(0) of source entry 302(0). As will be discussed in more detail below, once a producer instruction $I_0$-$I_{N-1}$ producing a value for a source register is committed, its bit field in the source dependency indicator 234(0)-234(M-1) in the respective source entry 302(0)-302(M-1) for the register $R_0$-$R_{M-1}$ can be cleared (e.g., bit set to '0') to indicate that such register $R_0$-$R_{M-1}$ is no longer dependent on the producer instruction $I_0$-$I_{N-1}$.

FIG. 3B is a diagram of an alternative instruction dependency tracking table circuit 306 that can be included in the RMT circuit 224 in the processor 202 in FIG. 2 as previously discussed to track direct and/or indirect source dependencies of a producer instruction(s) 208F to consumer instructions 208F. The RMT circuit 224 in the processor 202 is augmented with source entries 302(0)-302(M-1) each configured to store a source dependency indicator 234(0)-234(M-1) indicating a source's direct or indirect dependence on a producer instruction 208, $I_0$-$I_{N-1}$. As shown in the example in FIG. 3B, a source dependency indicator 234(0) of bits '000 . . . ' is stored in the source entry 302(0) for register $R_0$. This means that each of the producer instructions $I_0$, $I_1$, and $I_2$ are not indicated (indicated by a '0' bit in this example) as producing a value in register $R_0$. Source dependency indicator 234(1) of bits '011 . . . ' is stored in the source entry 302(1) for register $R_1$. This means that each of the producer instructions $I_1$ and $I_2$ are indicated (indicated by a '1' bit in this example) as producing a value to register $R_1$; such register $R_1$ is dependent on the producer instructions $I_1$ and $I_2$. Source dependency indicator 234(M-1) of bits '100 . . . ' is stored in the source entry 302(M-1) for register $R_{M-1}$. This means that instruction $I_2$ is indicated as producing a value to register $R_{M-1}$; such register $R_{M-1}$ is dependent on the producer instruction $I_2$. Once a producer instruction $I_0$-$I_{N-1}$ producing a value for a source is committed, its corresponding bit field in the source dependency indicator 234(0)-234(M-1) in the respective source entry 302(0)-302(M-1) for the register $R_0$-$R_{M-1}$ can be cleared (e.g., bit set to '0') to indicate that such source is no longer dependent on the producer instruction $I_0$-$I_{N-1}$.

FIG. 4 is a flowchart illustrating an exemplary process 400 of the instruction dependency tracking circuit 232 in the processor 202 in FIG. 2 updating a source entry 302(0)-302(M-1) in a instruction dependency tracking table, such as instruction dependency tracking table circuit 300 in FIG. 3A, or the instruction dependency tracking table circuit 306 included in the RMT circuit 224 in FIG. 3B. The instruction dependency tracking circuit 232 is configured to update a source entry 302(0)-302(M-1) in the instruction dependency tracking table circuit 300, 306 in response to a producer instruction 208F, $I_0$-$I_{N-1}$ and consumer instruction 208F, $I_0$-$I_{N-1}$ being processed in the instruction stream 214 in the instruction processing circuit 204 in FIG. 2. The process 400 in FIG. 4 is discussed in reference to the processor 202 in FIG. 2.

In this regard, the process 400 includes the instruction dependency tracking circuit 232 receiving an instruction $I_0$-$I_{N-1}$, 208F from an instruction pipeline $IP_0$-$IP_N$) in the instruction processing circuit 204 (block 402). In one example, the instruction dependency tracking circuit 232 determines if the received instruction $I_0$-$I_{N-1}$, 208F comprises a source (e.g., a source register $R_0$-$R_{M-1}$) as a target operand (block 404). In response to determining the received instruction $I_0$-$I_{N-1}$, 208F comprises a source as the target operand (block 406), the instruction dependency tracking circuit 232 is configured to store an instruction identifier (e.g., a '1' bit) of the received instruction $I_0$-$I_{N-1}$, 208F in an updated source dependency indicator 234(0)-234 (M−1) indicating a producer instruction $I_0$-$I_{N-1}$, 208F of the associated source register $R_0$-$R_{M-1}$ in a source entry 302(0)- 302(M−1) among a plurality of source entries 302(0)-302 (M−1) in a instruction dependency tracking table circuit 300, 306 (block 408). The instruction dependency tracking circuit 232 is then configured to communicate the updated source dependency indicators 234(0)-234(M−1) stored in the plurality of source entries 302(0)-302(M−1) to at least one processing circuit in the instruction processing circuit 204 configured to process an instruction $I_0$-$I_{N-1}$, 208F having a source dependency in the updated source dependency indicators 234(0)-234(M−1) (block 410).

As discussed above, the instruction dependency tracking circuit 232 is configured to communicate updated source dependency indicators 234(0)-234(M−1) stored in source entries 302(0)-302(M−1) to one or more processing circuits in the instruction processing circuit 204 in FIG. 2 to be used in processing consumer instructions having the recorded direct and/or indirect source dependency. For example, this processing circuit could be a scheduler circuit 242 in the instruction processing circuit 204 in FIG. 2. The scheduler circuit 242 could use the updated source dependency indicators 234(0)-234(M−1) to determine if a consumer instruction $I_0$-$I_{N-1}$, 208F in a reservation entry waiting to be issued for execution should be replayed for example. For example, the updated source dependency indicators 234(0)-234(M−1) can indicate older producer instructions with a source as a target operand that is also a source for consumer instruction 208F.

In this regard, FIG. 5 is an example of a scheduler circuit 500 that can be included as the scheduler circuit 242 in the instruction processing circuit 204 in FIG. 2. The scheduler circuit 500 can be configured to receive the updated source dependency indicators 234(0)-234(M−1) from the instruction dependency tracking circuit 232 to be used to determine if a consumer instruction $I_0$-$I_{N-1}$, 208F in a reservation entry waiting to be issued for execution should be replayed for example. As illustrated in FIG. 5, the scheduler circuit 500 includes a reservation station circuit 502 that includes a plurality of reservation entries 504 each configured to store a received instruction $I_0$-$I_{N-1}$, 208F from the instruction pipeline $IP_0$-$IP_{N-1}$ to be executed. The reservation station circuit 502 also includes one or more pick circuits 506 each configured to identify instructions in the reservation entries 504 to be issued in an issue lane circuit to be executed. More exemplary detail of the reservation entries 504 and the pick circuits 506 is illustrated in FIG. 6 discussed below. The scheduler circuit 500 also includes a plurality of source readiness circuits 508(0)-508(M−1) each associated with a register $R_0$-$R_{M-1}$. Each source readiness circuit 508(0)-508 (M−1) includes a respective source entry 510(0)-510(M−1) to store a respective existing source dependency indicator 234(0)-234(M−1) for the respective register $R_0$-$R_{M-1}$. The source readiness circuits 508(0)-508(M−1) are each coupled to the pick circuits 506 to provide an unpick instruction indicator 512 if an instruction $I_0$-$I_{N-1}$, 208F is determined to have a source dependency such that the instruction 208F cannot be issued for execution.

With continuing reference to FIG. 5, the scheduler circuit 500 is coupled to a source dependency broadcast bus 514 that is configured to receive the updated source dependency indicators 234(0)-234(M−1) communicated by the instruction dependency tracking circuit 232. In this example, the respective updated source dependency indicators 234(0)- 234(M−1) are provided to the respective source readiness circuits 508(0)-508(M−1). Each source readiness circuit 508(0)-508(M−1) in this example includes a updating logic circuit 516(0)-516(M−1) to perform a logic AND operation on the respective updated source dependency indicators 234(0)-234(M−1) ('a') and the complement of the existing source dependency indicators 234(0)-234(M−1) to capture any new producer instruction $I_0$-$I_{N-1}$, 208F that the assigned register $R_0$-$R_{M-1}$ is dependent on. Each source readiness circuit 508(0)-508(M−1) in this example also includes a respective replay control circuit 518(0)-518(M−1). The replay control circuits 518(0)-518(M−1) are configured to generate a respective replay indicator 520(0)-520(M−1) to a respective source ready indicator circuit 522(0)-522(M−1) based on a logic AND operation of a replay indicator (Replay) of the respective updated source dependency indicators 234(0)-234(M−1) ('a') and the complement of the existing source dependency indicators 234(0)-234(M−1). Both a replay indication from the source ready indicator circuit 522(0)-522(M−1) and the replay control circuit 518 (0)-518(M−1) cause the unpick instruction indicator 512 to unpick an instruction $I_0$-$I_{N-1}$, 208F having a direct or indirect source dependence on a new producer instruction indicated in the updated respective source dependency indicators 234(0)-234(M−1).

With continuing reference to FIG. 5, each source readiness circuit 508(0)-508(M−1) in this example includes a respective register free circuit 524(0)-524(M−1) coupled to the respective source entry 510(0)-510(M−1). The register free circuits 524(0)-524(M−1) are each configured to generate a respective register free indicator 526(0)-526(M−1) indicating a free state for its associated source register $R_0$-$R_{M-1}$ if its existing source dependency indicators 234 (0)-234(M−1) stored in the source entry 510(0)-510(M−1) indicate that there are no longer any uncommitted producer instructions $I_0$-$I_{N-1}$, 208F for which the respective source register $R_0$-$R_{M-1}$ is dependent. In this example, source entry 510(0)-510(M−1) indicates that there are no longer any uncommitted producer instructions $I_0$-$I_{N-1}$, 208F for which the respective source register $R_0$-$R_{M-1}$ is dependent if the source dependency indicator 234(0)-234(M−1) is a '0' bit vector. The scheduler circuit 500 includes a free register circuit 528 configured to receive and perform a logical AND operation on the register free indicators 526(0)-526(M−1) and generate an entry free indicator 530 in response. If the entry free indicator 530 indicates that all registers $R_0$-$R_{M-1}$ are no longer on a producer instruction $I_0$-$I_{N-1}$, 208F indicated by a free state (i.e., a logic '0'), the reservation entries 504 can be freed up by any instruction $I_0$-$I_{N-1}$, 208F reserved therein being issued for execution.

FIG. 6 is a diagram of additional exemplary detail of the scheduler circuit 500 in FIG. 5. The scheduler circuit 500 includes a plurality (M number) of reservation station circuits 502(0)-502(M−1). As an example, reservation station circuit 502(0) includes an '$Q_0$' number of reservation entries 504(0)(0)-504(0)($Q_0$−1), in this example. Reservation station circuit 502(M−1) includes an '$Q_E$−1' number of reservation entries 504(M−1)(0)-504(M−1)($Q_E$−1) in this example. Only two reservation station circuits 502(0), 502 (M−1) are shown, but note that any number of N reservation station circuits can be included in the scheduler circuit 500. The reservation entries 504(0)(0)-504(0)($Q_0$−1)-504(M−1) (0)-504(M−1)($Q_E$−1) in the respective reservation station circuits 502(0)-502(M−1) are configured to store received instructions, including consumer instructions, until ready to be executed in the execution circuit 216 in FIG. 2. The scheduler circuit 500 is configured to issue instructions, including consumer instructions $I_0$-$I_{N-1}$, 208F, ready to be executed to one of the issue lanes $L_0$-$L_{K-1}$ that are coupled to execution lanes $E_0$-$E_{K-1}$ in the execution circuit 216 be executed. The execution circuit 216 is designed to be able to receive and concurrently execute 'K' number of instructions dispatched in common K issue lanes $L_0$-$L_{K-1}$, and K execution lanes $E_0$-$E_{K-1}$ are provided for increased performance. Thus, in this example, $Q_0$ is the instruction window size of reservation station circuit 502(0), $Q_E$−1 is the instruction window size of reservation station circuit 502(M−1), and 'K' is referred to as the issue width or the number of issue lanes $L_0$-$L_{K-1}$ in which producer instructions can be issued to the execution circuit 216 to be executed.

With continuing reference to FIG. 6, each reservation station circuit 502(0)-502(M−1) includes a respective pick circuit 506(0)-506(M−1) that tracks the instructions in the respective reservation entries 504(0)(0)-504(0)($Q_0$−1)-504(M−1)(0)-504(M−1)($Q_E$−1) to determine when such instructions are ready to be issued. In this regard, each of the reservation entries 504(0)(0)-504(0)($Q_0$−1)-504(M−1)(0)-504(M−1)($Q_E$−1) are coupled to the respective source readiness circuits 508(0)-508(M−1) as indicated by tracking lines 610(0)(0)-610($Q_0$−1)-610(M−1)(0)-610(M−1)($Q_E$−1) that each can communicate tracking information about an instruction stored in a respective reservation entry 504(0)(0)-504(0)($Q_0$−1)-504(M−1)(0)-504(M−1)($Q_E$−1). The source readiness circuits 508(0)-508(M−1) can operate as discussed in FIG. 5. The source readiness circuits 508(0)-508(M−1) are also coupled to respective K wake-up signals 612(0)-612(K) that are generated by K issue lane circuits 614(0)-614(K−1) in the respective issue lanes $L_0$-$L_{K-1}$. Each issue lane circuit 614(0)-614(K−1) associated with a respective issue lane $L_0$-$L_{K-1}$ is configured to generate a respective wake-up signal 612(0)-612(K) on a wake-up signal port 615 in response to a producer instruction 208F being issued by the scheduler circuit 500 in the respective issue lane $L_0$-$L_{K-1}$.

With reference back to the scheduler circuit 500 in FIG. 6, the wake-up signals 612(0)-612(K) indicate an issue state as either issue ready or issue not ready. When a producer instruction is issued in an issue lane $L_0$-$L_{K-1}$ by the scheduler circuit 500, this means that it will be executed by the execution circuit 216 and its produced data resulting from execution available to be consumed by any consumer instruction of the producer instruction. The source readiness circuits 508(0)-508(M−1) in the respective pick circuits 506(0)-506(M−1) are configured to compare respective wake-up signals 612(0)-612(K) having an issue state indicating issue ready for issued producer instructions up to M instructions in the respective reservation entries 504(0)(0)-504(0)($Q_0$−1)-504(M−1)(0)-504(M−1)($Q_E$−1) to determine if any such instructions are ready to be executed. For example, if a reservation entry 504(0)(0)-504(0)($Q_0$−1)-504(M−1)(0)-504(M−1)($Q_E$−1) is a consumer of the issued producer instruction in the respective reservation station circuit 502(0)-502(M−1), the issuance of its producer instructions $I_0$-$I_{N-1}$, 208F indicated by a respective wake-up signal 612(0)-612(K) indicates that the data from the producer instruction $I_0$-$I_{N-1}$, 208F will become available, and thus the consumer instruction $I_0$-$I_{N-1}$, 208F can be issued if no other source operands are unavailable. The source readiness circuits 508(0)-508(M−1) are configured to generate respective $Q_0$-$Q_E$ instruction ready signals 616(0)(0)-616(0)($Q_0$−1)-616(M−1)(0)-616(M−1)($Q_E$−1) indicating if an instruction in a respective reservation entry 504(0)(0)-304(0)($Q_0$−1)-504(M−1)(0)-504(M−1)($Q_E$−1) is ready to be issued based on the comparison of the respective received wake-up signals 612(0)-612(K) for issued producer instructions $I_0$-$I_{N-1}$, 208F to respective $Q_0$-$Q_E$ instructions in the respective reservation entries 504(0)(0)-504(0)($Q_0$−1)-504(M−1)(0)-504(M−1)($Q_E$−1). For example, the source readiness circuits 508(0)-508(M−1) may be comparator circuits that are configured to compare the respective received wake-up signals 612(0)-612(K) for issued producer instructions 208F to respective $Q_0$-$Q_E$ instructions in the respective reservation entries 504(0)(0)-504(0)($Q_0$−1)-504(M−1)(0)-504(M−1)($Q_E$−1). As another example, the source readiness circuits 508(0)-508(M−1) may be matrix circuits that are configured to compare the respective received wake-up signals 612(0)-612(K) for issued producer instructions $I_0$-$I_{N-1}$, 208F to respective $Q_0$-$Q_E$ instructions in the respective reservation entries 504(0)(0)-504(0)($Q_0$−1)-504(M−1)(0)-504(M−1)($Q_E$−1).

With continuing reference to FIG. 5, the pick circuits 506(0)-506(M−1) in the respective reservation station circuits 502(0)-502(M−1) include respective K pick circuits 618(0)(0)-618(0)(K−1)-618(M−1)(0)-618(M−1)(K−1) that are configured to receive the respective $Q_0$-$Q_E$ instruction ready signals 616(0)(0)-616(0)($Q_0$−1)-616(M−1)(0)-616(M−1)($Q_E$−1) from the respective source readiness circuits 508(0)-508(M−1) and generate respective K issue lane pick signals 620(0)(0)-620(0)(K−1)-620(M−1)(0)-620(M−1)(K−1) to identify respective instructions in the reservation entries 504(0)(0)-504(0)($Q_0$−1)-504(M−1)(0)-504(M−1)($Q_E$−1) that are ready to be issued, indicated by an issue state being issue ready. Providing the $Q_0$-$Q_E$ instruction ready signals 616(0)(0)-616(0)($Q_0$−1)-616(M−1)(0)-616(M−1)($Q_E$−1) to K respective K issue lane pick signals 620(0)(0)-620(0)(K−1)-620(M−1)(0)-620(M−1)(K−1) will involve multiplexing of signals in each reservation station circuit 602(0)-602(M−1) if K is not equal to M. The issue lane pick signals 620(0)(0)-620(0)(K−1)-620(M−1)(0)-620(M−1)(K−1) are provided to K issue selection circuits 622(0)(0)-622(0)(K−1)-622(M−1)(0)-622(M−1)(K−1) in the respective reservation station circuits 502(0)-502(M). The issue selection circuits 622(0)(0)-622(0)(K−1)-622(M−1)(0)-622(M−1)(K−1) are each coupled to the respective reservation entries 504(0)(0)-504(0)($Q_0$−1)-504(M−1)(0)-504(M−1)($Q_E$−1) such the $Q_0$-$Q_E$ entries in the respective reservation entries 504(0)(0)-504(0)($Q_0$−1)-504(M−1)(0)-504(M−1)($Q_E$−1) are multiplexed into respective K issue selection circuits 622(0)(0)-622(0)(K−1)-622(M−1)(0)-622(M−1)(K−1) if K is not equal to M. The issue selection circuits 622(0)(0)-622(0)(K−1)-622(M−1)(0)-622(M−1)(K−1) are configured to select an instruction from a respective reservation entry 504(0)(0)-504(0)($Q_0$−1)-504(M−1)(0)-504(M−1)($Q_E$−1) in response to the instruction identified in the respective issue lane pick signals 620(0)(0)-620(0)(K−1)-620(M−1)(0)-620(M−1)(K−1) ready to be issued having an issue state of issue ready. The issue selection circuits 622(0)(0)-622(0)(K−1)-622(M−1)(0)-622(M−1)(K−1) are each configured to provide identified instruction signals 630(0)(0)-630(0)(K−1)-630(M−1)(0)-630(M−1)(K−1) to be issued from the received respective issue lane pick signals 620(0)(0)-620(0)(K−1)-620(M−1)(0)-620(M−1)(K−1) to respective K issue arbitration circuits 628(0)-628(K−1) coupled to a respective associated issue lane $L_0$-$L_{K-1}$. The issue arbitration circuits 628(0)-628(K−1) are each configured to pass an instruction among the instructions selected from the respective issue selection circuits 622(0)(0)-622(0)(K−1)-622(M−1)(0)-622(M−1)(K−1) to the respective associated issue lane $L_0$-$L_{K-1}$. The issue arbitration circuits 628(0)-628(K−1) are configured to decide between which of the reservation station circuits' 602(0)-602(M−1) instructions selected by the respective issue selection circuits 622(0)(0)-622(0)(K−1)-622(M−1)(0)-622(M−1)(K−1) for the issue lane $L_0$-$L_{K-1}$ will actually be issued onto the respective issue lane $L_0$-$L_{K-1}$ in the current clock cycle.

The issue arbitration circuits 628(0)-628(K−1) in the scheduler circuit 500 in FIG. 5 can be configured to decide between which competing reservation station circuits' 602(0)-602(M−1) instructions selected by the respective issue selection circuits 622(0)(0)-622(0)(K−1)-622(M−1)(0)-622(M−1)(K−1) for the issue lane $L_0$-$L_{K-1}$ will actually be issued onto the respective issue lane $L_0$-$L_{K-1}$ in the current clock cycle based on an allocation policy. For example, issue arbitration circuits 628(0)-628(K−1) may be configured with an issue arbitration policy to pass the selected instructions from the respective issue selection circuits 622(0)(0)-622(0)(K−1)-622(M−1)(0)-622(M−1)(K−1) to an associated respective issue lane $L_0$-$L_{K-1}$ that are from the lowest latency reservation station circuit 602(0)-602(M−1) if more than one reservation station circuit 602(0)-602(M−1) is competing for issuance of an instruction to an issue lane $L_0$-$L_{K-1}$. Alternatively, the issue arbitration circuits 628(0)-628(K−1) may be configured with an issue arbitration policy to pass the selected instructions from the respective issue selection circuits 622(0)(0)-622(0)(K−1)-622(M−1)(0)-622(M−1)(K−1) to an associated respective issue lane $L_0$-$L_{K-1}$ that are from the highest latency reservation station circuit 502(0)-502(M−1). As yet another alternative, the issue arbitration circuits 628(0)-628(K−1) may be configured with an issue arbitration policy to pass the selected instructions from the respective issue selection circuits 622(0)(0)-622(0)(K−1)-622(M−1)(0)-622(M−1)(K−1) to an associated respective issue lane $L_0$-$L_{K-1}$ based on a heuristic determination between the reservation station circuit 502(0)-502(M−1). For example, this heuristic determination may be based on available capacities of the reservation station circuit 502(0)-502(M−1), frequency of conflict between reservation station circuit 502(0)-502(M−1), a random selection between competing reservation station circuit 502(0)-502(M−1), and a switching back and forth between competing reservation station circuits 502(0)-502(M−1), as non-limiting examples.

In other exemplary aspects, the instruction dependency tracking circuit 232 in the instruction processing circuit 204 of the processor 202 in FIG. 2 can be configured to facilitate producer instructions $I_0$-$I_{N-1}$, 208F tracking its source dependent, consumer instructions $I_0$-$I_{N-1}$, 208F. As an example, the source dependency indicator 234(0)-234(M−1) in the instruction dependency tracking table circuits 300, 306 in FIGS. 3A and 3B could be used as a pointer to another influencer tracking table circuit configured to have or allocate separate influencer instruction entries for each producer instruction. The influencer instruction entries in the influencer tracking table circuit would be configured to indicate each source location dependent on influencer, producer instruction. When the source dependency indicator 234(0)-234(M−1) is updated to record a source's dependency on a producer instruction $I_0$-$I_{N-1}$, 208F, the source location of a consumer instruction $I_0$-$I_{N-1}$, 208F that is dependent on such source, and thus dependent on the respective producer instruction $I_0$-$I_{N-1}$, 208F, can be recorded. A source location may be the identification of a particular reservation station circuit 502(1)-502(M−1) in the scheduler circuit 500 in FIG. 6 as one non-limiting example. As other examples, the source location could be an offset into an instruction block or an offset from the beginning of a subroutine with instruction $I_0$-$I_{N-1}$, 208F as other non-limiting examples.

For example, if instruction $I_2$ having source register 'R6' is assigned to reservation station circuit '5', and the source dependency bit vector '011' is stored in association with register 'R6' in the RMT circuit 224 (meaning register 'R6' is source dependent on instructions I0 and I1), influencer instruction entries in an influencer tracking table circuit for producer instructions I0 and I1 could be both updated to indicate that a reservation station circuit is dependent on respective instructions I0 and I1. In this example, the source locations recorded in the influencer instruction entries in the influencer tracking table circuit can then be used to control to which reservation station circuits the source dependency indicators 234(0)-234(M−1) are sent by the instruction dependency tracking circuit 232. Reservation station circuits can then use the received source dependency indicators 234(0)-234(M−1) to determine if a consumer instruction $I_0$-$I_{N-1}$, 208F having an identified dependent register $R_0$-$R_{M-1}$ identified should be replayed for example. In this example, a scheduler circuit does not have to be configured with entries for storing all the source dependency indicators 234(0)-234(M−1).

In this regard, FIG. 7 is a diagram of an exemplary influencer tracking table (ITT) circuit 700 configured to have or allocate separate influencer instruction entries 702(0)-702(N−1) that can be assigned to producer instructions $I_0$-$I_{N-1}$, 208F for tracking source locations in source indicators 704(0)-704(N−1) in the instruction processing circuit 204 of a consumer instruction $I_0$-$I_{N-1}$, 208F having a source dependency on the respective producer instructions $I_0$-$I_{N-1}$, 208F. In this manner, the ITT circuit 700 facilitates producer instructions $I_0$-$I_{N-1}$, 208F tracking its source dependent, consumer instructions $I_0$-$I_{N-1}$, 208F. As will be discussed below, the source dependency indicators 234(0)-234(M−1) can be used to index the influencer instruction entries 702(0)-702(N−1) to retrieve source locations in source indicators 704(0)-704(N−1) of consumer instructions $I_0$-$I_{N-1}$, 208F having a source dependency on the respective instructions $I_0$-$I_{N-1}$, 208F.

FIG. 8 is a diagram of an exemplary updating of the RMT circuit 224 in FIG. 3A containing the instruction dependency tracking table circuit 306 and indexing the influencer instruction entries 702(0)-702(N−1) in the ITT circuit 700 in FIG. 7 to record source locations to facilitate producer instructions $I_0$-$I_{N-1}$, 208F tracking their source dependent, consumer instructions $I_0$-$I_{N-1}$, 208F. In this regard, an exemplary instruction stream 214 is included that includes instructions $I_0$-$I_7$. Instruction $I_0$ in reservation station circuit '5' sets register 'R5'='10'. The source dependency indicator 234(5) in the RMT circuit 224 is updated to '1b' (i.e., binary) to assign instruction $I_0$ to influencer instruction entry 702(0) in the ITT circuit 700. The source dependency indicator 234(5) is an index to the influencer instruction entries 702(0) in the ITT circuit 700. Influencer instruction entry 702(0) is allocated in the ITT circuit 700 and indexed by source dependency indicator 234(5). Since instruction $I_0$ is a producer instruction that is not influenced by another producer instruction, the source locations 0−M−1 in the influencer instruction entry 702(0) is set to all '0' bits. Next, instruction $I_1$ in reservation station circuit '7' sets register 'R6'='20'. The source dependency indicator 234(6) in the RMT circuit 224 is updated to '2b' to assign instruction $I_1$ to influencer instruction entry 702(1) in the ITT circuit 700. Influencer instruction entry 702(1) is allocated in the ITT circuit 700. The source dependency indicator 234(5) is an index to the influencer instruction entries 702(1) in the ITT circuit 700. Since instruction $I_1$ is producer instruction that is not influenced by another producer instruction, the source locations 0−M−1 in the influencer instruction entry 702(1) is set to all '0' bits.

With continuing reference to FIG. 8, instruction $I_2$ in reservation station circuit '2' sets register 'R5' equal to 'R5'+'1'. Thus, instruction $I_2$ is a consumer of register 'R5' that is set by instruction $I_0$. The source dependency indicator 234(5) in the RMT circuit 224 remains '2b' since instruction $I_2$ is not a producer instruction that influences another instruction. An influencer instruction entry 702 is not allocated in the ITT circuit 700 for instruction $I_2$ However, since instruction $I_2$ is influenced by instruction $I_0$ meaning instruction $I_2$ is dependent on instruction $I_0$, the instruction dependency tracking circuit 232 sets source location '2' in source indicator 704(0) in influencer instruction entries 702(0) to a '1' bit to indicate that the dependent consumer instruction $I_2$ is in reservation station circuit '2' as the source location. As previously discussed, this source location can be used by other circuits, such as a reservation station circuit in a scheduler circuit, in the instruction processing circuit 204 in FIG. 2 to process instruction $I_2$. Instruction $I_3$ in reservation station circuit '0' sets register 'R6' equal to 'R6'+'1'. Thus, instruction $I_3$ is a consumer of register 'R6' that is set by instruction $I_1$. The source dependency indicator 234(6) in the RMT circuit 224 remains '2b' since instruction $I_3$ is not a producer instruction that influences another instruction. An influencer instruction entry 702 is not allocated in the ITT circuit 700 for instruction $I_3$ However, since instruction $I_3$ is influenced by instruction $I_1$ meaning instruction $I_3$ is dependent on instruction $I_3$, the instruction dependency tracking circuit 232 sets source location '0' in source indicator 704(1) in influencer instruction entries 702(1) to a '1' bit to indicate that the dependent consumer instruction $I_3$ is in reservation station circuit '0' as the source location. As previously discussed, this source location can be used by other circuits, such as a reservation station circuit in a scheduler circuit in the instruction processing circuit 204 in FIG. 2 to process instruction $I_3$.

With continuing reference to FIG. 8, instruction $I_4$ in reservation station circuit '3' sets register 'R7' equal to 'R5'+'R6'. Thus, instruction $I_4$ is a consumer of registers 'R5' and 'R6' that are influenced by instructions $I_0$ and $I_1$. Instruction $I_4$ is indirectly dependent on instruction $I_0$ and instruction $I_1$ as ancestor producer instructions that produce values for registers 'R5' and 'R6' and thus affect instruction $I_4$. Instruction $I_4$ is directly dependent on instruction $I_2$ and instruction $I_3$ as also affecting the registers 'R5' and 'R6'. The source dependency indicators 234(5), 234(6) in the RMT circuit 224 remains the same since instruction $I_4$ is not a producer instruction that influences another instruction. However instruction $I_4$ is a producer instruction that sets register 'R7'. Thus, influencer instruction entry 702(2) is allocated in the ITT circuit 700 and indexed by source dependency indicator 234(7). The source dependency indicator 234(7) in the RMT circuit 224 is updated to '111' (i.e., bit vector 111') to assign influencer instruction entries 702(0), 702(1), 702(2) in the ITT circuit 700. Since instruction $I_4$ is a producer instruction that is not influenced by another producer instruction, the source locations 0-M-1 in the influencer instruction entry 702(2) is set to all '0' bits. Next, instruction $I_5$ in reservation station circuit '1' sets register 'R7' equal to 'R7'+'1'. Thus, instruction $I_5$ is a consumer of register 'R7' that is set by instruction $I_4$, and thus instruction $I_5$ is directly dependent on instruction $I_4$ Instruction $I_5$ is indirectly dependent on instructions $I_2$, $I_3$ as producer instructions that produce values for registers 'R5' and 'R6' and thus affect instruction $I_5$. Instruction $I_5$ is indirectly dependent on instructions $I_0$, $I_1$ as ancestor producer instructions that produce values for registers 'R5' and 'R6' and thus affect instruction $I_4$. Instruction $I_4$ is directly dependent on instruction $I_2$ and instruction $I_3$ as also affecting the registers 'R5' and 'R6'. The source dependency indicator 234(7) in the RMT circuit 224 remains '111' since instruction $I_5$ is not a producer instruction that influences another instruction. An influencer instruction entry 702 is not allocated in the ITT circuit 700 for instruction $I_5$ However, since instruction $I_5$ is influenced by instruction $I_4$, meaning instruction $I_5$ is dependent on instruction $I_4$, the instruction dependency tracking circuit 232 sets source location '1' in source indicator 704(2) in influencer instruction entries 702(2) to a '1' bit to indicate that the dependent consumer instruction $I_5$ is in reservation station circuit '1' as the source location.

Next, instruction $I_6$ in reservation station circuit '6' sets register 'R6' equal to 'R6'-'1'. Thus, instruction $I_6$ is a consumer of register 'R6' that is set by instruction $I_1$ as an ancestor producer to instruction $I_6$. Thus, instruction $I_6$ has an indirect dependence on instruction $I_1$. Instruction $I_6$ is directly dependent on instruction $I_3$ The source dependency indicator 234(6) in the RMT circuit 224 remains '010b' since instruction $I_6$ is not a producer instruction that influences another instruction. An influencer instruction entry 702 is not allocated in the ITT circuit 700 for instruction $I_6$. However, since instruction $I_6$ is influenced by instruction meaning instruction $I_6$ is dependent on instruction $I_1$ the instruction dependency tracking circuit 232 sets source location '6' in source indicator 704(1) in influencer instruction entries 702(1) to a '1' bit to indicate that the dependent consumer instruction $I_6$ is in reservation station circuit '6' as the source location. Next, instruction $I_7$ in reservation station circuit '4' sets register 'R5' equal to 'R5'-'1'. Thus, instruction $I_7$ is a consumer of register 'R5' that is set by instruction $I_0$ as an ancestor producer instruction to instruction $I_7$. Thus, instruction $I_7$ has an indirect dependence on instruction $I_0$. Instruction $I_7$ is directly dependent on instruction $I_2$. The source dependency indicator 234(5) in the RMT circuit 224 remains '010b' since instruction $I_7$ is not a producer instruction that influences another instruction. An influencer instruction entry 702 is not allocated in the ITT circuit 700 for instruction $I_7$. However, since instruction $I_7$ is influenced by instruction $I_0$, meaning instruction $I_7$ is dependent on instruction $I_0$, the instruction dependency tracking circuit 232 sets source location '4' in source indicator 704(0) in influencer instruction entries 702(0) to a '1' bit to indicate that the dependent consumer instruction $I_7$ is in reservation station circuit '4' as the source location.

FIG. 9 is an example of a scheduler circuit 900 that can be included as the scheduler circuit 242 in the instruction processing circuit 204 in FIG. 2 to support receiving information about producer instructions 208F that influence consumer instructions $I_0$-$I_{N-1}$, 208F in the reservation station circuits 502 based on information in the ITT circuit 700 in FIG. 7. As discussed below, the source locations recorded in the influencer instruction entries 702(0)-702(N-1) in the ITT circuit 700 that are updated by the instruction dependency tracking circuit 232 can be used to control to which reservation station circuits 502 receive information about new producer instructions $I_0$-$I_{N-1}$, 208F. For example, the scheduler circuit 900 may be configured to receive updated source dependency indicators 234(0)-234(M-1) as identified by the source locations in source indicators 704(0)-704(N-1) in the indexed influencer instruction entries 702(0)-702(N-1) in the ITT circuit 700. Common elements between the scheduler circuit 900 in FIG. 9 and the scheduler circuit 500 in FIG. 5 are shown with the same element numbers in FIG. 9.

With reference to FIG. 9, the scheduler circuit 900 can be configured to receive the updated source dependency indicators 234(0)-234(M−1) from the instruction dependency tracking circuit 232 to be used to determine if a consumer instruction $I_0$-$I_{N-1}$, 208F in a reservation entry waiting to be issued for execution should be replayed for example. The scheduler circuit 900 does not have to provide source entries 510(0)-510(M−1) to store the source dependency indicators 234(0)-234(M−1) like in the scheduler circuit 500 in FIG. 5, because the ITT circuit 700 tracks the source location for consumer instructions 208F of the producer instructions 208F. As illustrated in FIG. 9, the scheduler circuit 900 includes a reservation station circuit 502 that includes a plurality of reservation entries 504 each configured to store a received instruction $I_0$-$I_{N-1}$, 208F from the instruction pipeline $IP_0$-$IP_{N-1}$ to be executed. The reservation station circuit 502 also includes one or more pick circuits 506 each configured to identify instructions in the plurality of reservation entries 504 to be issued in an issue lane circuit to be executed.

The scheduler circuit 900 also includes a plurality of source readiness circuits 908(0)-908(M−1) each associated with a source register $R_0$-$R_{M-1}$. The source readiness circuits 908(0)-908(M−1) are each coupled to the pick circuits 506 to provide an unpick instruction indicator 512 if an instruction $I_0$-$I_{N-1}$, 208F is determined to have a source dependency such that the instruction $I_0$-$I_{N-1}$, 208F cannot be issued for execution. The source readiness circuits 908(0)-908(M−1) are coupled to a respective plurality of source dependency lines 914(0)-914(M−1) that are each configured to receive an updated source dependency indicator 234(0)-234(M−1) associated with a register $R_0$-$R_{M-1}$, communicated by the instruction dependency tracking circuit 232. Each source readiness circuit 908(0)-908(M−1) in this example also includes a respective replay control circuit 918(0)-918(M−1). The replay control circuits 918(0)-918(M−1) are configured to generate a respective replay indicator 520(0)-520(M−1) to a respective source ready indicator circuit 522(0)-522(M−1) when an instruction $I_0$-$I_{N-1}$, 208F is to be replayed based on the received source dependency indicator 234(0)-234(M−1). Both a replay indication from the source ready indicator circuit 522(0)-522(M−1) and the replay control circuit 918(0)-918(M−1) can cause the unpick instruction indicator 512 to unpick an instruction $I_0$-$I_{N-1}$, 208F having a direct or indirect source dependence on a new producer instruction indicated in the updated respective source dependency indicators 234(0)-234(M−1).

With continuing reference to FIG. 9, each source readiness circuit 908(0)-908(M−1) in this example also includes a respective register free circuit 924(0)-924(M−1). The register free circuits 924(0)-924(M−1) are each configured to generate a respective register free indicator 926(0)-926(M−1) indicating a free state for its associated register $R_0$-$R_{M-1}$ if the received updated source dependency indicator 234(0)-234(M−1) indicates that there are no longer any uncommitted producer instructions for which the respective register $R_0$-$R_{M-1}$ is dependent. In this example, the source entry 510(0)-510(M−1) indicates that there are no longer any uncommitted producer instructions for which the respective register $R_0$-$R_{M-1}$ is dependent if the updated source dependency indicator 234(0)-234(M−1) is a '0' bit vector. The scheduler circuit 900 includes a free register circuit 528 configured to receive and perform a logical AND operation on the register free indicators 926(0)-926(M−1) and generate an entry free indicator 530 in response. If the entry free indicator 530 indicates that all registers $R_0$-$R_{M-1}$ are no longer on a producer instruction $I_0$-$I_{N-1}$, 208F indicated by a free state (i.e., a logic '0'), the reservation entries 504 can be freed up by any instruction $I_0$-$I_{N-1}$, 208F reserved therein being issued for execution.

FIG. 10 is a block diagram of an exemplary processor-based system 1000 that includes a processor 1002 (e.g., a microprocessor) that includes an instruction processing circuit 1004 that includes an instruction dependency tracking circuit 1006 for tracking direct and/or indirect source dependencies. For example, the instruction dependency tracking circuit 1006 could be the instruction dependency tracking circuit 232 in FIG. 2 as a non-limiting example. The instruction processing circuit 1004 could also include a scheduler circuit 1007 configured to receive source dependency indicators for controlling processing of instructions dependent on producer instructions. For example, the instruction dependency tracking circuit 1006 could be any of the scheduler circuits 500, 900 in FIGS. 5, 6, and 9 respectively, as non-limiting examples. The processor-based system 1000 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server, or a user's computer. In this example, the processor-based system 1000 includes the processor 1002. The processor 1002 represents one or more general-purpose processing circuits, such as a microprocessor, central processing unit, or the like. More particularly, the processor 1002 may be an EDGE instruction set microprocessor, or other processor implementing an instruction set that supports explicit consumer naming for communicating produced values resulting from execution of producer instructions. The processor 1002 is configured to execute processing logic in instructions for performing the operations and steps discussed herein. In this example, the processor 1002 includes an instruction cache 1008 for temporary, fast access memory storage of instructions accessible by the instruction processing circuit 1004. Fetched or prefetched instructions from a memory, such as from a system memory 1010 over a system bus 1012, are stored in the instruction cache 1008. The instruction processing circuit 1004 is configured to process instructions fetched into the instruction cache 1008 and process the instructions for execution.

The processor 1002 and the system memory 1010 are coupled to the system bus 1012 and can intercouple peripheral devices included in the processor-based system 1000. As is well known, the processor 1002 communicates with these other devices by exchanging address, control, and data information over the system bus 1012. For example, the processor 1002 can communicate bus transaction requests to a memory controller 1014 in the system memory 1010 as an example of a slave device. Although not illustrated in FIG. 10, multiple system buses 1012 could be provided, wherein each system bus constitutes a different fabric. In this example, the memory controller 1014 is configured to provide memory access requests to a memory array 1016 in the system memory 1010. The memory array 1016 is comprised of an array of storage bit cells for storing data. The system memory 1010 may be a read-only memory (ROM), flash memory, dynamic random access memory (DRAM), such as synchronous DRAM (SDRAM), etc., and a static memory (e.g., flash memory, static random access memory (SRAM), etc.), as non-limiting examples.

Other devices can be connected to the system bus 1012. As illustrated in FIG. 10, these devices can include the system memory 1010, one or more input device(s) 1018, one or more output device(s) 1020, a modem 1022, and one or more display controllers 1024, as examples. The input device(s) 1018 can include any type of input device, including but not limited to input keys, switches, voice processors, etc. The output device(s) 1020 can include any type of output device, including but not limited to audio, video, other visual indicators, etc. The modem 1022 can be any device configured to allow exchange of data to and from a network 1026. The network 1026 can be any type of network, including but not limited to a wired or wireless network, a private or public network, a local area network (LAN), a wireless local area network (WLAN), a wide area network (WAN), a BLUETOOTH™ network, and the Internet. The modem 1022 can be configured to support any type of communications protocol desired. The processor 1002 may also be configured to access the display controller(s) 1024 over the system bus 1012 to control information sent to one or more displays 1028. The display(s) 1028 can include any type of display, including but not limited to a cathode ray tube (CRT), a liquid crystal display (LCD), a plasma display, etc.

The processor-based system 1000 in FIG. 10 may include a set of instructions 1030 to be executed by the processor 1002 for any application desired according to the instructions. The instructions 1030 may be stored in the system memory 1010, processor 1002, and/or instruction cache 1008 as examples of a non-transitory computer-readable medium 1032. The instructions 1030 may also reside, completely or at least partially, within the system memory 1010 and/or within the processor 1002 during their execution. The instructions 1030 may further be transmitted or received over the network 1026 via the modem 1022, such that the network 1026 includes the computer-readable medium 1032.

While the computer-readable medium 1032 is shown in an exemplary embodiment to be a single medium, the term "computer-readable medium" should be taken to include a single medium or multiple media (e.g., a centralized or distributed database, and/or associated caches and servers) that stores the one or more sets of instructions. The term "computer-readable medium" shall also be taken to include any medium that is capable of storing, encoding, or carrying a set of instructions for execution by the processing device and that causes the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A processor, comprising:
   an instruction processing circuit comprising one or more instruction pipelines and configured to fetch a plurality of instructions from a memory into an instruction pipeline among the one or more instruction pipelines;
   an instruction dependency tracking table circuit comprising a plurality of source entries each associated with a respective source, and each configured to store a source dependency indicator indicating a producer instruction of the associated source; and
   an instruction dependency tracking circuit configured to:
      receive an instruction from an instruction pipeline among the one or more instruction pipelines;
      determine if the received instruction comprises a source as a target operand; and
      in response to determining the received instruction comprises the source as the target operand:
         store an instruction identifier of the received instruction in an updated source dependency indicator in a source entry associated with the source in the instruction dependency tracking table circuit; and
      communicate the updated source dependency indicators stored in the plurality of source entries to at least one processing circuit in the instruction processing circuit configured to process an instruction having a source dependency in the updated source dependency indicators.

2. The processor of claim 1, further comprising:
   a physical register file comprising a plurality of physical registers; and
   a rename map table circuit comprising the instruction dependency tracking table circuit, the rename map table circuit comprising:
      the plurality of source entries and further configured to store at least one address pointer pointing to an address of a physical register among the plurality of physical registers in the physical register file; and
   wherein:
      the instruction processing circuit is configured to map a source of a producer instruction among the fetched plurality of instructions to a source entry in the rename map table circuit mapped to the physical register among the plurality of physical registers in the physical register file.

3. The processor of claim 1, wherein each of the plurality of source entries in the instruction dependency tracking table circuit are configured to store the source dependency indicator comprising a source dependency bit vector comprising a plurality of bits, where each bit is configured to indicate a designated producer instruction of the associated source.

4. The processor of claim 1, wherein the instruction dependency tracking circuit is configured to communicate the updated source dependency indicators to a reservation station circuit as a processing circuit among the at least one processing circuit.

5. The processor of claim 1, wherein the instruction processing circuit further comprises a scheduler circuit comprising a processing circuit among the at least one processing circuit, scheduler circuit comprising:
   a source dependency broadcast bus configured to receive a source dependency indicator communicated by the instruction dependency tracking circuit; and
   a reservation station circuit, comprising:
      a plurality of reservation entries each configured to store a received instruction from an instruction pipeline among the one or more instruction pipelines to be executed; and
      at least one pick circuit configured to identify instructions in the plurality of reservation entries to be issued in an issue lane circuit to be executed; and
      a plurality of source readiness circuits each comprising a source entry, each coupled to the at least one pick circuit, and each assigned to a respective source, each of the plurality of source readiness circuits configured to:
         receive the updated source dependency indicator associated with its respective source on the source dependency broadcast bus; and
         replace an existing source dependency indicator with the received updated source dependency indicator in its source entry.

6. The processor of claim 5, wherein the plurality of source readiness circuits are each further configured to:
   determine if a new producer instruction is identified in the updated source dependency indicator; and in response to determining the new producer instruction is identified in the updated source dependency indicator, cause an instruction in a reservation entry among the plurality of reservation entries having the source of the source dependency indicator to be replayed.

7. The processor of claim 6, wherein the plurality of source readiness circuits are each further configured to:
   determine if a new producer instruction is identified in the updated source dependency indicator; and
   in response to determining the new producer instruction is identified in the updated source dependency indicator, instruct the at least one pick circuit to unpick an instruction in a reservation entry among the plurality of reservation entries having the source of the source dependency indicator.

8. The processor of claim 5, wherein the plurality of source readiness circuits are each further configured to:
   determine if a new producer instruction is identified in the updated source dependency indicator; and
   in response to determining the new producer instruction is identified in the updated source dependency indicator, instruct the at least one pick circuit to unpick an instruction in a reservation entry among the plurality of reservation entries having the source of the source dependency indicator.

9. The processor of claim 5, wherein:
   the plurality of source readiness circuits are each further configured to:
      determine if the received updated source dependency indicator does not indicate any producer instructions; and
      in response to determining the received updated source dependency indicator does not indicate any producer instructions, generate a register free indicator indicating a free state for its associated source; and
   the scheduler circuit further comprises a free register circuit configured to receive the register free indicator from the respective plurality of source readiness circuits, and generate an entry free indicator indicating a free state to the plurality of reservation entries indicating that instructions having source dependencies can be freed.

10. The processor of claim 1,
   further comprising an influencer tracking table circuit comprising:
      a plurality of influencer instruction entries each associated with a producer instruction among the fetched plurality of instructions;
      each influencer instruction entry among the plurality of influencer instruction entries comprising a source indicator indicating a source location of an instruction having a source dependency with an influencer instruction associated with the plurality of influencer instruction entries;
   the instruction dependency tracking circuit further configured to:
      in response to determining the received instruction comprises the source:
         index an influencer instruction entry in the influencer tracking table circuit based on the updated source dependency indicator; and
         update the source indicator in the indexed influencer instruction entry in the influencer tracking table circuit with a source location of an instruction having a source dependency with an influencer instruction associated with the indexed influencer instruction entry.

11. The processor of claim 10, wherein the instruction dependency tracking circuit is further configured to, in response to determining the received instruction comprises the source:
   communicate the updated source dependency indicators stored in the plurality of source entries to a processing circuit among the at least one processing circuit, identified by the source locations in source indicators in an indexed influencer instruction entry in the influencer tracking table circuit associated with the respective updated source dependency indicator.

12. The processor of claim 11, wherein the instruction processing circuit further comprises a scheduler circuit comprising a processing circuit among the at least one processing circuit, scheduler circuit comprising:
   a plurality of source dependency lines each configured to receive an updated source dependency indicator associated with the source communicated by the instruction dependency tracking circuit; and
   a reservation station circuit, comprising:
      a plurality of reservation entries each configured to store a received instruction from an instruction pipeline among the one or more instruction pipelines to be executed;
      at least one pick circuit configured to identify instructions in the plurality of reservation entries to be issued in an issue lane circuit to be executed; and
      a plurality of source readiness circuits each coupled to the at least one pick circuit, and each assigned to a respective source, each of the plurality of source readiness circuits configured to:
         receive an updated source dependency indicator associated with its respective source on a source dependency line among the plurality of source dependency lines associated with its respective source; and
         replace an existing source dependency indicator with the received updated source dependency indicator in its source entry.

13. The processor of claim 12, wherein the plurality of source readiness circuits are each further configured to:
   determine if a new producer instruction is identified in the updated source dependency indicator; and
   in response to determining if the new producer instruction is identified in the updated source dependency indicator, cause an instruction in a reservation entry among the plurality of reservation entries having the source of the source dependency indicator to be replayed.

14. The processor of claim 13, wherein the plurality of source readiness circuits are each further configured to:
   determine if a new producer instruction is identified in the updated source dependency indicator; and
   in response to determining the new producer instruction is identified in the updated source dependency indicator, instruct the at least one pick circuit to unpick an instruction in a reservation entry among the plurality of reservation entries having the source of the source dependency indicator.

15. The processor of claim 12, wherein the plurality of source readiness circuits are each further configured to:
   determine if a new producer instruction is identified in the updated source dependency indicator; and
   in response to determining the new producer instruction is identified in the updated source dependency indicator, instruct the at least one pick circuit to unpick an instruction in a reservation entry among the plurality of reservation entries having the source of the source dependency indicator.

16. The processor of claim 12, wherein:
the plurality of source readiness circuits are each further configured to:
   determine if the received updated source dependency indicator does not indicate any producer instructions;
   in response to determining the received updated source dependency indicator does not indicate any producer instructions, generate a register free indicator indicating a free state for its associated source; and
the reservation station circuit further comprising a free register circuit configured to receive the register free indicator from the respective plurality of source readiness circuits, and generate an entry free indicator indicating a free state to the plurality of reservation entries indicating that instructions having source dependencies can be freed.

17. A method of tracking source dependencies of producer instructions in a processor, comprising:
   receiving an instruction from an instruction pipeline among one or more instruction pipelines in an instruction processing circuit;
   determining if the received instruction comprises a source as a target operand; and
   in response to determining the received instruction comprises the source as the target operand:
      storing an instruction identifier of the received instruction in an updated source dependency indicator indicating a producer instruction of an associated source in a source entry among a plurality of source entries in an instruction dependency tracking table circuit; and
      communicating the updated source dependency indicators stored in the plurality of source entries to at least one processing circuit in the instruction processing circuit configured to process an instruction having a source dependency in the updated source dependency indicators.

18. The method of claim 17,
wherein communicating the updated source dependency indicators further comprises broadcasting the updated source dependency indicators on a source dependency broadcast bus coupled to a scheduler circuit in the instruction processing circuit; and
further comprising:
   receiving an instruction from an instruction pipeline among the one or more instruction pipelines to be executed;
   identifying instructions in a plurality of reservation entries to be issued in an issue lane circuit to be executed;
   receiving the updated source dependency indicator associated with its respective source on the source dependency broadcast bus; and
   replacing an existing source dependency indicator with the received updated source dependency indicator in its source entry.

19. The method of claim 18, further comprising:
determining if a new producer instruction is identified in the updated source dependency indicator; and
causing an instruction in a reservation entry among the plurality of reservation entries having the source of a source dependency indicator to be replayed, in response to determining the new producer instruction is identified in the updated source dependency indicator.

20. The method of claim 18, further comprising, in response to determining the received instruction comprises the source:
   indexing an influencer instruction entry in an influencer tracking table circuit based on the updated source dependency indicator, the influencer tracking table circuit comprising:
      a plurality of influencer instruction entries each associated with a producer instruction among a fetched plurality of instructions; and
      each influencer instruction entry among the plurality of influencer instruction entries comprising a source indicator indicating a source location of an instruction having a source dependency with an influencer instruction associated with the plurality of influencer instruction entries; and
   updating the source indicator in the indexed influencer instruction entry in the influencer tracking table circuit with a source location of an instruction having a source dependency with the influencer instruction associated with the indexed influencer instruction entry.

* * * * *